United States Patent
Bryll

(10) Patent No.: US 8,055,466 B2
(45) Date of Patent: Nov. 8, 2011

(54) GLOBAL CALIBRATION FOR STEREO VISION PROBE

(75) Inventor: Robert Kamil Bryll, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 874 days.

(21) Appl. No.: 12/050,850

(22) Filed: Mar. 18, 2008

(65) Prior Publication Data

US 2008/0239327 A1    Oct. 2, 2008

Related U.S. Application Data

(63) Continuation-in-part of application No. 11/694,837, filed on Mar. 30, 2007, now abandoned.

(51) Int. Cl.
*G01D 18/00* (2006.01)
(52) U.S. Cl. .......................................... 702/85
(58) Field of Classification Search .............. 702/85
See application file for complete search history.

(56) References Cited

U.S. PATENT DOCUMENTS

| | | |
|---|---|---|
| 5,805,287 A | 9/1998 | Pettersen |
| 5,828,770 A | 10/1998 | Leis |
| 6,112,423 A | 9/2000 | Sheehan |
| 6,134,506 A | 10/2000 | Rosenberg |
| 6,166,809 A | 12/2000 | Pettersen |
| 6,199,024 B1 | 3/2001 | Bunimovich |
| 6,497,134 B1 | 12/2002 | Faul |
| 6,608,688 B1 | 8/2003 | Faul |
| 7,511,829 B2 * | 3/2009 | Babayoff ...................... 356/601 |
| 2002/0100884 A1 | 8/2002 | Maddock |
| 2004/0152233 A1 | 8/2004 | Nemets |
| 2006/0054608 A1 | 3/2006 | Cahill |

FOREIGN PATENT DOCUMENTS

WO      0235904 A2    5/2002

OTHER PUBLICATIONS

Horn, B.K.P., "Relative Orientation," International Journal of Computer Vision 4:59-78, Jan. 1990.

* cited by examiner

*Primary Examiner* — Aditya Bhat
(74) *Attorney, Agent, or Firm* — Christensen O'Connor Johnson Kindness PLLC

(57) ABSTRACT

A method for global calibration of a multi-view vision-based touch probe measurement system is provided which encompasses calibrating camera frame distortion errors as well as probe form errors. The only required features in the calibration images are the markers on the touch probe. The camera frame distortion calibration comprises a process that depends on a portable calibration jig and the touch probe, but that process is unaffected by probe form distortion errors in the touch probe and/or tip. The probe tip position calibration depends on applying the results of the camera, frame distortion calibration. When the same probe tip is used throughout the global calibration, the probe tip position calibration uses images from the set of images used by the camera frame distortion calibration. The global calibration method is particularly advantageous for low cost portable versions of multi-view vision-based touch probe measurement systems.

17 Claims, 12 Drawing Sheets

GLOBAL CALIBRATION FOR STEREO VISION PROBE

CROSS-REFERENCE(S) TO RELATED APPLICATION(S)

This application is a continuation-in-part of U.S. patent application Ser. No. 11/694,837, filed Mar. 30, 2007, priority from the filing date of which is hereby claimed under 35 U.S.C. §120.

FIELD OF THE INVENTION

The invention relates generally to precision measurement instruments, and more particularly to a system and method of global calibration for a multi-view vision-based touch probe locating system that is used in a coordinate measuring system.

BACKGROUND OF THE INVENTION

Various types of touch probe coordinate measuring systems are known. In the type of touch probe coordinate measuring system under consideration here, the workpiece is measured by using a multi-camera vision system to determine the location of the touch probe when the touch probe tip is at a desired location on a workpiece surface. A visual marker pattern is located on the body of the touch probe, with the markers being imaged by at least two cameras of the vision system, and the images are used to triangulate the position of each of the markers in three dimensional space. Based on this data the probe tip location coordinates and the adjacent workpiece surface coordinates may be inferred or estimated.

Factors that limit the measurement accuracy of the type of touch probe measurement systems outlined above include errors that are introduced by distortions and/or erroneous assumptions regarding the coordinate frame associated with the multi-camera vision system. Such errors are referred to as camera frame distortion errors herein. Errors are also introduced by distortions and/or erroneous assumptions regarding the relationship between the marker locations in the probe tip location. Such errors are referred to as probe form errors herein.

U.S. Pat. Nos. 5,828,770, 5,805,287, and 6,497,134 each disclose various features related to the type of touch probe coordinate measuring system outlined above, and each is hereby incorporated by reference in its entirety. The '770 patent describes systems and methods related to performing measurements using an object (e.g. a probe) that includes a plurality of activatable markers. However, the '770 patent is generally not directed toward systems and methods for reducing camera frame distortion errors or probe form errors, and includes few, if any, teachings in this regard.

In contrast the '287 patent discloses a method for calibrating and/or correcting certain types of camera frame distortion errors. To briefly summarize that calibration method, the '287 patent teaches that: (i) the positions of permanently mounted light sources or reflectors are registered by their image on each camera, and their positions in the image are given as coordinates related to a camera fixed coordinate system; and (ii) the positions of at least two points for which the mutual separation distances are known are registered by holding a probing tool in contact with the points, and the positions of the points are calculated from the observed images of the light sources or reflectors of the probing tool. Based on the obtained data, the correct length scale in the camera frame may be established, and optical properties of the cameras may be mathematically modeled such that image distortions occurring through the camera lens may be compensated, all of which falls within the scope of calibrating and/or compensating camera frame distortion errors. However, the teachings of the '287 patent with regard to camera frame distortion errors do not encompass potential probe form errors, or their potential deleterious influence on the camera frame distortion calibration methods of the '287 patent.

The '134 patent discloses a method for calibrating and/or correcting a probe form error. In particular, the '134 patent addresses determining a location error for a feature of a surgical probe or instrument (e.g. its tip), relative to a set of energy emitters (e.g. markers) on its body. To briefly summarize the calibration method, the '134 patent teaches that the location error is found by: (i) calculating the position and orientation of the body having the energy emitters disposed thereon, in a plurality of orientations and positions relative to a reference frame, but with the feature (e.g. the tip) in a substantially constant position relative to the reference frame, (ii) calculating the locations of the feature of the object (e.g. the tip) from these calculated positions and orientations, (iii) averaging these calculated locations, (iv) determining the location of the feature by physical measurement thereof in relation to the physical locations of the emitters, and (v) comparing the calculated average location with the physically measured location to arrive at the error. In order to reduce or avoid the effects of camera frame distortion errors when determining probe form error, the teachings of the '134 patent include imaging a local reference frame that comprises an additional plurality of "fixed emitters", at the same time that the "body emitters" are imaged. Calculating the positions and orientations of the "body emitters" relative to the additional "fixed emitters", rather than relative to the overall camera frame, largely circumvents the effects of camera frame distortion errors. Otherwise, the teachings of the '134 patent with regard to calibrating or correcting probe form error do not encompass potential camera frame distortion errors, or their potential deleterious influence on probe form error calibration methods in the absence of additional "fixed emitters" in the calibration images.

As outlined above, a calibration method that efficiently encompasses camera frame distortion errors, as well as probe form errors, is not in evidence. Rather, separate calibration of these errors, using fixed reference emitters, or the like, is the norm. The present invention is directed to providing a system and method that overcomes the foregoing and other disadvantages.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In general the invention disclosed herein is described in terms of its application to a system that uses dual-camera stereo vision. However, it should be appreciated that the invention disclosed herein is applicable to any system configuration that can be used to provide a valid set of triangulation images (e.g. at least two respective images of the same object taken from at least two respective viewpoints, using stable triangulation geometry). For example, the invention may be readily adapted to sets of triangulation images that are provided from at least two controlled or known viewpoints using a single camera, or to sets of more than two triangulations images (e.g. provided from three cameras at three viewpoints). In general, in many or most contexts herein, the term camera may be generalized to the term view or viewpoint. For example, a multi-camera triangulation system is one instance of the more general case, which is a multi-viewpoint triangulation system. Thus, the various embodiments described herein are exemplary only, and not limiting.

A system and method for efficient global calibration of a multi-view vision-based touch probe locating system is provided which encompasses determining camera frame distortion errors as well as probe form errors wherein the only relevant features in the calibration images comprise the markers or emitters on the touch probe. The camera frame distortion calibration operations comprise an iterative calibration process that depends on the use of a touch probe with a tip. Nevertheless, the camera frame distortion calibration operations are independent of, or unaffected by, any probe form distortion errors in the touch probe and/or tip. The probe tip position calibration operations depend on the results of the camera frame distortion calibration, and also use calibration images wherein the only relevant features in the images are the markers on the touch probe. When the same probe tip is used throughout the entire global calibration procedure, particular efficiency results from the fact that the images used by the probe tip position calibration operations are from the same set of images used by the camera frame distortion calibration operations. It should be appreciated that the terra "camera frame distortion" as used herein refers to a coordinate system frame, not a physical frame.

The global calibration method is particularly advantageous for a practical and low cost portable and/or "desktop" version of a multi-camera vision-based touch probe locating system, although its use is not restricted to such systems. It should be appreciated that the features of prior art systems, such as separate calibration procedures for various types of errors and/or the use of fixed marker arrangements in addition to the markers included on the probe body, may make the cost and/or complexity of such systems prohibitive for many applications. It should be appreciated that for "desktop" systems, ease-of-use is a critical factor, in that such systems may be intended for use by relatively unskilled or occasional users that demand the best possible calibration results while using the simplest possible calibration objects and the simplest and most comprehensible set of operations. It should also be appreciated that "desktop" systems may be constructed using low cost materials and techniques, such that interchangeable parts such as probe styli or tips are formed imprecisely and/or cameras and/or mechanical frames may be relatively more susceptible to thermal or physical distortions, or the like. Thus, for desktop systems, simple and efficient calibration may assume relatively more importance than it has in prior art systems, such as industrial and medical systems.

In accordance with another aspect of the invention, the global calibration system includes a probe, a multi-view triangulation system, and a portable calibration jig. The probe may be a manual touch probe which includes a marker pattern with a plurality of markers (e.g. IR LEDs) on the probe body. The multi-view triangulation system is operable to determine first-level three dimensional coordinates for each of the probe markers based on images from at least two respective views. The portable calibration jig may include a plurality of probe tip positioning reference features (e.g. visual fidacials or mechanical constraints). In one embodiment, during the calibration process, the probe tip is constrained at each of the reference features of the portable calibration jig, while the body of the probe is rotated around the tip and the multi-view triangulation system takes images of the probe markers. Through triangulation of the positions of the probe markers, their three dimensional coordinates may be determined. The locations of the probe markers in the various orientations may be analyzed to estimate the coordinates of the location of the probe tip and the reference feature that it is constrained at. The geometric relationships between the estimated/measured locations of the reference features may be compared with known geometric relationships between the reference features, in order to provide a camera frame distortion calibration (e.g. a set of coordinate frame distortion parameters that characterize and/or compensate for errors related to camera distortion and/or camera position errors) that approximately eliminates the camera frame distortion errors. An iterative procedure may improve the accuracy of the estimated/measured locations of the reference features and the camera frame distortion calibration. In various embodiments, the locations of the probe markers in the various orientations may also be corrected using the camera frame distortion calibration, and then analyzed to define a local coordinate system (LCS) relative to the touch probe marker pattern. In various embodiments, principal component analysis (PCA), or the like, may be used to determine the LCS. For each orientation, a probe tip position vector may then be defined between a reference point in the corresponding LCS and the best available estimated coordinates of the corresponding reference feature. The probe tip position vectors corresponding to each orientation may then be averaged, or fit using least squares fit, or otherwise analyzed, to determine the probe tip position calibration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
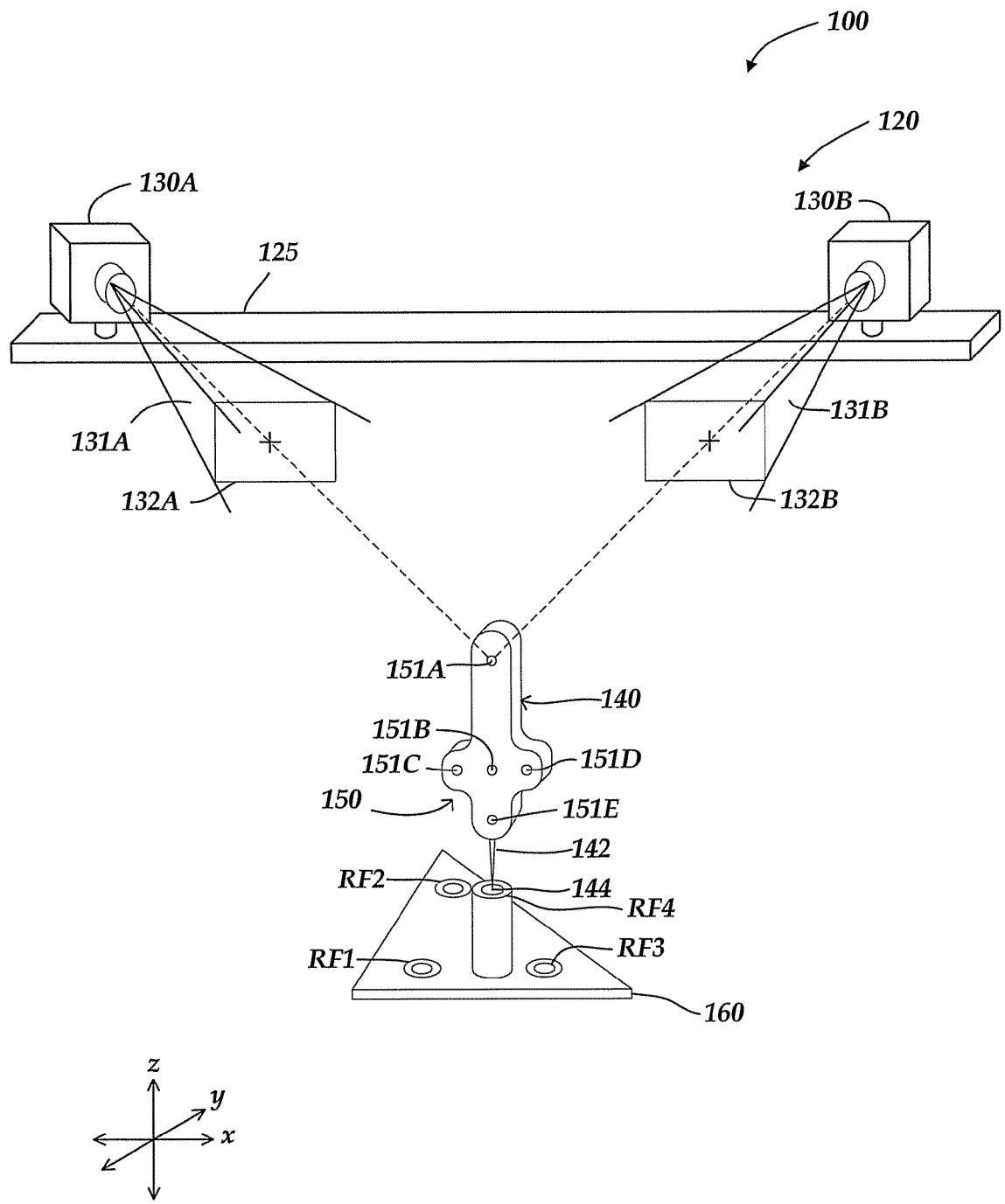
FIG. 1 is a diagram of a first exemplary embodiment of a stereo vision touch probe system calibration arrangement.

FIG. 1 is a diagram of a first exemplary embodiment of a multi-view touch probe system calibration arrangement 100.

The present arrangement may be interchangeably referred to as a stereo-vision touch probe system calibration arrangement 100, since this particular embodiment uses a typical dual-camera stereo vision arrangement. The calibration arrangement 100 includes a stereo vision touch probe system 120 and a portable calibration jig 160. The stereo vision touch probe system 120 includes a mounting frame 125, two cameras 130A and 130B, and a touch probe 140. The body of the touch probe 140 includes a marker pattern 150, which includes a set of individual markers 151A-151E that are imaged by the stereo vision cameras 130A and 130B. Each of the individual markers 151A-151E may comprise IR LEDs or other light sources or any other types of markers which may be reliably imaged by the stereo vision cameras. The end of the touch probe 140 also includes a stylus 142 with a probe tip 144. The stylus 142 and/or the probe tip 144 may be interchangeable or replaceable on the touch probe 140. In various embodiments, similar to the majority of touch probes used in automated coordinate measurement machines, the touch probe 140 may be of a type that emits a data capture trigger signal when the probe tip 144 is deflected (e.g. by a sub-micron increment) relative to its nominal position. However, in various other embodiments, and particularly in manual touch probe systems, the stylus 142 and/or the probe tip 144 may be rigidly attached to the body of the touch probe 140 and a data capture trigger signal may be provided by other means, e.g. by the user activating a mouse or keyboard button or other switch.

In operation, the stereo vision cameras 130A and 130B are able to image the locations of the markers 151A-151E, which are rigidly located relative to one another and relative to the location of the probe tip 144. The stereo vision cameras 130A and 130B have imaging volumes 131A and 131B and fields of view 132A and 132B, respectively, for viewing the markers 151A-151E. The imaging volumes 131A and 131B intersect to define an approximate working volume of the stereo vision touch probe system 120. In the illustration of FIG. 1, a "crosshair" marker is shown where the probe marker 151A would appear in the images of the fields of view 132A and 132B. Generally speaking, known geometric triangulation methods may be used to determine the coordinates of the markers in the working volume based on their locations in the images, in combination with known positions and orientations of the cameras. It will be appreciated that the accuracy of such triangulation methods may be compromised by camera frame distortion errors (e.g. errors due to optical distortions, as well as due to distortions of the presumed relationship between the camera positions and orientations), as previously discussed.

As will be described in more detail below, global calibration of the stereo vision touch probe system 120 is performed using a calibration jig such as the portable calibration jig 160, which supports calibration of both camera, frame distortion errors and probe form errors. The portable calibration jig 160 includes four reference features RF1-RF4. The distance relationships between the reference features RF1-RF4 are known, and the probe tip 144 can be placed at each reference position and constrained against translational motion while the body of the probe 140 is rotated around the constrained position of the probe tip 144. In one embodiment, each of the reference features RF1-RF4 includes a mechanical constraint, e.g. a conical recess or other kinematic constraint, to assist in preventing translation of the probe tip 144 while the body of the probe 140 is rotated around it. In another embodiment, a sharp probe tip is used, and the reference features are marked with a fiducial, or the like. The user then positions and constrains the sharp probe tip manually at the constraint position indicated by the fiducial, prior to rotating the body of the probe 140 around it.

The relationships between the coordinates of the reference features RF1-RF4 on the portable calibration jig 160 are precisely known by independent measurement. As will be described in more detail below with reference to FIGS. 4A and 4B, during the global calibration, of a multi-view vision-based touch probe system process the precisely known coordinate relationships of the reference features RF1-RF4 are compared to estimated measured locations determined using the vision-based touch probe system, and the differences are utilized for the calibration of camera frame distortion errors.

In alternate embodiments, a calibration jig may use different patterns or numbers of reference features that include mechanical or visual constraints, or the like. Generally, it is desirable for the reference features to include at least 4 features, at least one of which is non-coplanar with the others. In some embodiments, it is desirable to make their coordinates vary over a similar range in all three dimensions. As a specific example, in one embodiment a cubical configuration can be utilized with eight reference features (e.g. one at each corner of the cube). In general, increasing the number of calibration reference features may increase the reliability of the calibration, at the expense of increasing the calibration complexity and time.

Figure 2:
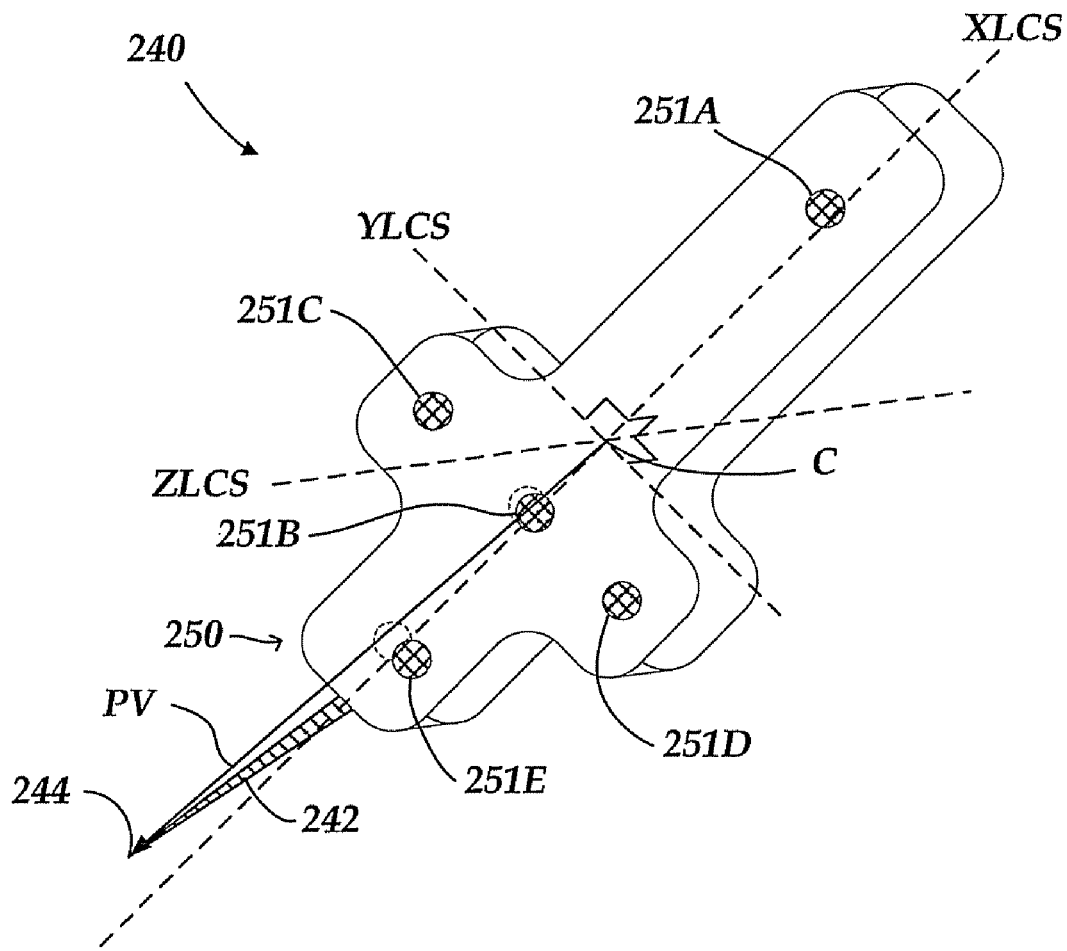
FIG. 2 is a diagram illustrating various features of a touch probe, including imperfections which may be addressed by probe tip position calibration.

FIG. 2 is a diagram illustrating various features of a touch probe 240, including imperfections which may be addressed by probe tip position calibration. The probe 240 is similar to the probe 140 of FIG. 1, except as otherwise described below. As shown in FIG. 2, the probe 240 includes a marker pattern 250 and a stylus 242 with a probe tip 244. The marker pattern 250 includes five individual markers 251A-251E. One example of imperfections which may occur in the probe 240 includes one or more of the markers 251A-251E deviating from their nominal or ideal positions. For example, as shown in FIG. 2, the imperfectly manufactured probe 240 has markers 251B and 251E that deviate from their nominal positions (the nominal positions being indicated by dotted-line circles adjacent to the actual marker positions). Another imperfection may be that the probe tip 244 deviates from its nominal or ideal position. For example, as shown in FIG. 2, the stylus 242 and probe tip 244 are not aligned with the body of the probe 240. Preventing probe form imperfections such as those outlined above may not be cost-effective in low cost desktop systems, or the like. It may be more cost effective and/or accurate to use probe tip position calibration according to this invention, described further below, to determine the actual "imperfect" location of the probe tip 244 relative to a probe coordinate system that is adapted to the actual "imperfect" marker pattern 250.

FIG. 2 shows one example of local coordinate system (LCS) that can be adapted or fit to any actual, "imperfect" marker pattern, such as the marker pattern 250. In particular, the orthogonal XLCS-YLCS-ZLCS axes shown in FIG. 2 may be established by applying the known mathematical technique of principal component analysis (PCA) to the three dimensional coordinates of any set of at least three markers. However, in general, better repeatability and/or accuracy may be obtained when more markers are used, and using more than five markers (e.g. 7 or 9 markers) on the probe 240 may be advantageous in various embodiments.

Generally speaking, for any set of at least two triangulation images corresponding to a measurement point, three dimensional coordinates may be established for each marker in the images by applying known triangulation techniques, as outlined above. Then, the LCS associated with the set of markers (and/or the touch probe) may be established by using PCA techniques as outlined further below, or the like. Once tire LCS has been established, the actual location of the probe tip 244 relative to the marker pattern 250 may be characterized by a calibrated probe tip position vector PV that extends from the origin of the LCS to the location of the probe tip, as shown in FIG. 2. The application of these techniques in a global calibration method according to this invention is described in greater detail below.

Regarding PCA techniques, PCA is a known orthogonal linear transformation technique for reducing multidimensional data sets. Unlike many other linear transforms, including those conventionally used for probe calibration, PCA does not have a fixed set of basis vectors. Its basis vectors depend on the data set. Thus, it is well suited to characterizing an unpredictably distorted marker pattern. In the present case, the basis vectors are colinear with the orthogonal axes of a corresponding LCS. The steps of PCA generally comprise: calculate the empirical mean of each dimension (e.g. the x-coordinate mean, etc.), calculate the deviations from the mean for each dimension, and find a diagonalized covariance matrix based on the deviations for all three dimensions. The eignevectors of the diagonalized covariance matrix are the basis vectors, which are colinear with the orthogonal axes of the LCS.

Figure 3:
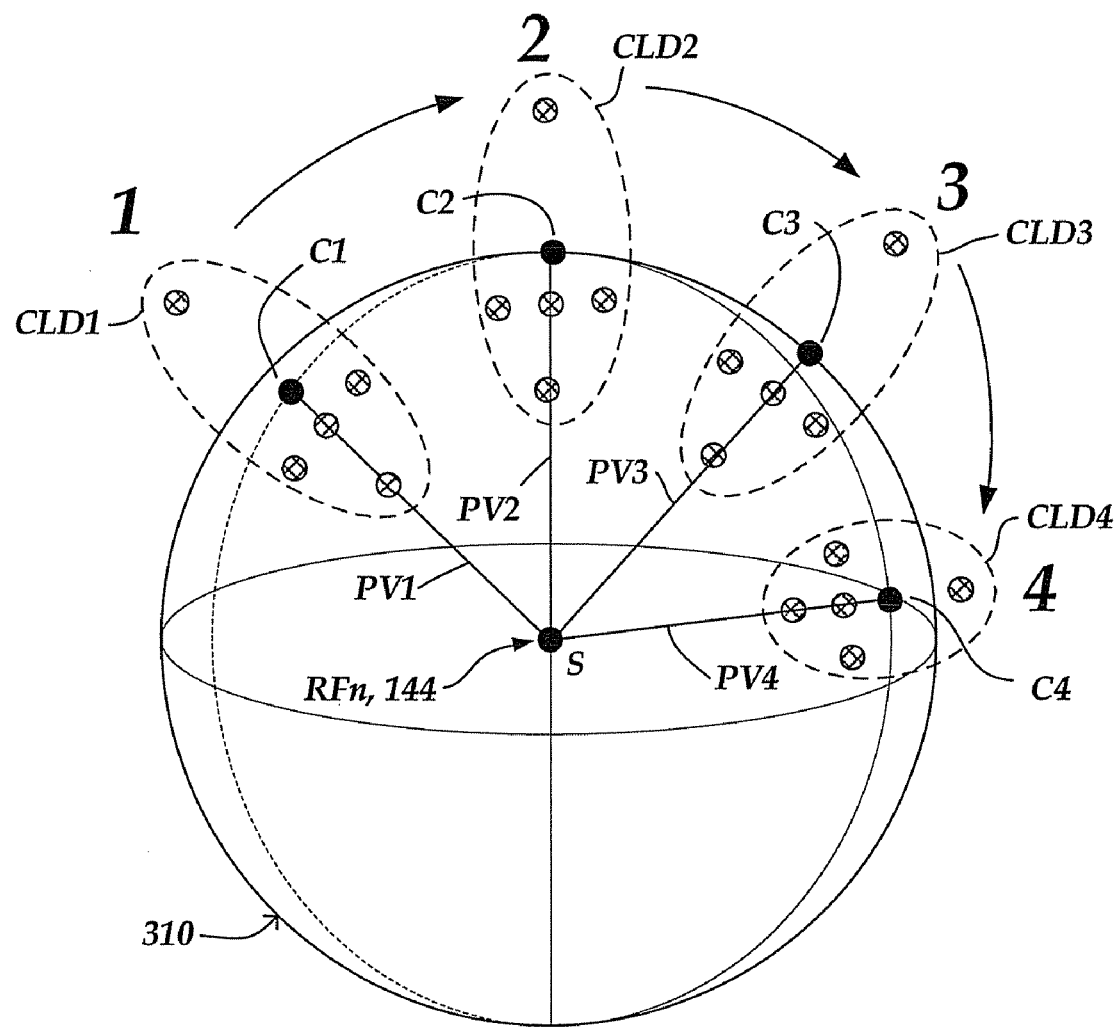
FIG. 3 is a schematic diagram illustrating various aspects of a global calibration process according to this invention, wherein the lip of a touch probe is constrained at a reference feature while the body of the probe with markers is rotated so that marker measurement images may be taken with the touch probe in multiple orientations.

FIG. 3 is a schematic diagram illustrating various aspects of a global calibration process according to this invention, wherein the tip (e.g. the tip 144) of a touch probe (e.g. the touch probe 140) is constrained at a generic reference feature RFn (e.g. the reference feature RF4), while the body of the touch probe is rotated so that marker measurement images may be taken of the probe marker pattern with the touch probe in multiple orientations. FIG. 3 illustrates a measurement sequence in which the probe has been rotated through a series of four orientations, orientations 1-4. For each orientation, triangulation images are acquired. Then, for each orientation, the triangulation images are analyzed according to known methods to determine the apparent three dimensional coordinates of the markers in the world coordinate system, that is, the overall coordinate system of the touch probe measurement system. This results in a measured and stored "cloud" of marker positions CLD1 at orientation 1, a cloud CLD2 at orientation 2, etc. Next, in one embodiment, a technique such as PCA is applied to the data of each cloud, as outlined with reference to FIG. 2, to determine the world coordinates of the origin of a LCS associated with the cloud. The origin of each LCS may be taken as a marker pattern reference point (genetically referred to as Cn) for the marker pattern at that orientation. Alternatively, if it is not useful to define the axes of the LCS during a particular phase or iteration within a global calibration method according to this invention, a marker pattern reference point that is approximately equivalent to the origin of the LCS may be found by a simpler mathematical procedure, for example the three-dimensional (3D) centroid of a marker pattern may be used as the marker pattern reference point in the initial phase of some embodiments of a global calibration method according to this invention.

Marker pattern reference points Cn are illustrated in FIG. 3 as marker pattern reference point C1 for cloud CLD1, marker pattern reference point C2 for cloud CLD2, etc. Ideally, for a rigid touch probe, the probe tip 144 should be at the same distance from each of the marker pattern reference points C1-C4. Therefore, a sphere 310 is fitted to the world coordinates of the marker pattern reference points C1-C4, according to known methods. For example, in one embodiment the sphere fitting may be expressed as a linear least squares problem and may be solved by standard linear methods (e.g. matrix pseudo-inverse).

In general, the center S of the fitted sphere 310 provides an estimate or measurement of the location of the probe tip 144 and the corresponding reference position RFn. However, it should be appreciated that during a first iteration of the portion of the global calibration process outlined above with reference to FIG. 3, camera frame distortion errors may generally introduce errors into the marker coordinate estimates/measurements and, therefore, into the resulting sphere fitting, and the resulting position estimates for the reference features RFn. Therefore, a global calibration process according to this invention initially repeats the process outlined above for a plurality of reference features (e.g. the reference features RF1-RF4, shown in FIG. 1), and determines a corresponding sphere center and estimated/measured location for each reference feature (e.g. RF1-RF4). An additional portion of the global calibration method then compares the geometric relationships between the estimated/measured locations of the reference features with the known geometric relationships of the reference features, in order to provide a camera frame distortion calibration (e.g. a set of camera frame distortion parameters) that approximately eliminates the camera frame distortion errors. In general, the camera frame distortion calibration will make the geometric relationships between the estimated/measured locations of the reference features in the world coordinate system approximately agree with the known geometric relationships of the reference features. A more complete description of this aspect of a global calibration process according to this invention is described in more detail below with reference to FIGS. 4A and 4B.

FIG. 3 also illustrates that the location of the sphere center S may be converted to a position in each LCS, defining the probe tip position vectors PV1-PV4 between each LCS origin and the sphere center S. In general, the position vectors PV1-PV4 may be analyzed (e.g. averaged, or replaced by a least squares fit) to provide a calibrated probe tip position vector PV, as previously outlined with reference to FIG. 2. However, it should be appreciated that early in a global calibration method according to this invention (prior to determining a useable camera frame distortion calibration), camera frame distortion errors may generally introduce errors into the marker coordinate estimates/measurements and, therefore, into the resulting sphere fitting and the associated estimates of the position vector PV and reference position RFn. Therefore, in various embodiments of a global calibration method according to this invention, an initial or subsequent camera frame distortion calibration is generally applied to remove camera frame distortion errors from the coordinates of the markers in the clouds (e.g. the clouds CD1-CD4) before determining the associated LCS's and position vectors (e.g. the position vectors PV1-PV4) and the resulting probe tip position calibration vector PV. A more complete description of this aspect of a global calibration process according to this invention is described in more detail below with reference to FIGS. 4A and 4B.

Figure 4A:
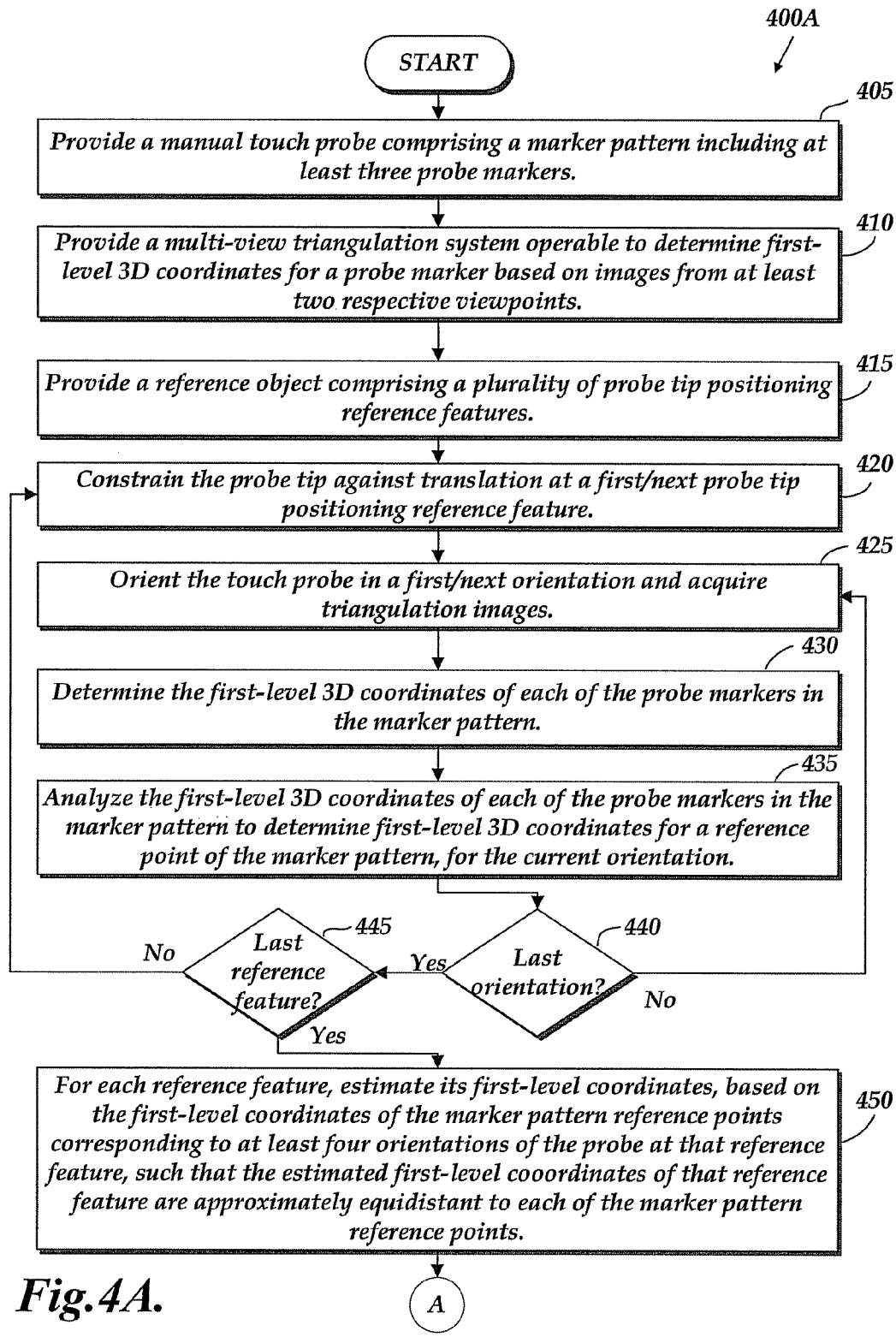
FIGS. 4A-4C are Row diagrams illustrating a first exemplary routine according to tins invention for global calibration of a multi-view vision-based touch probe system.
Figure 4B:
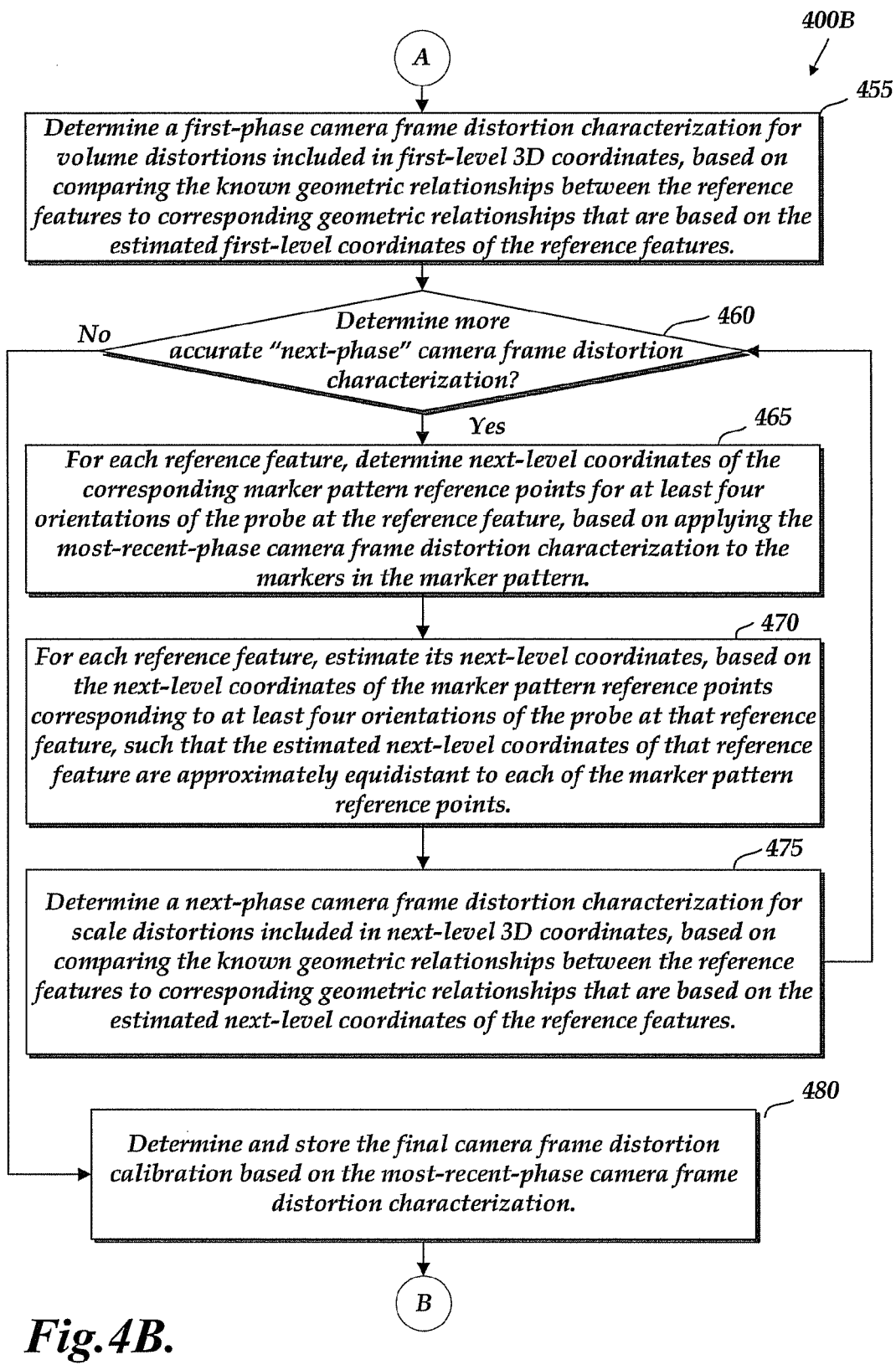
Figure 4C:
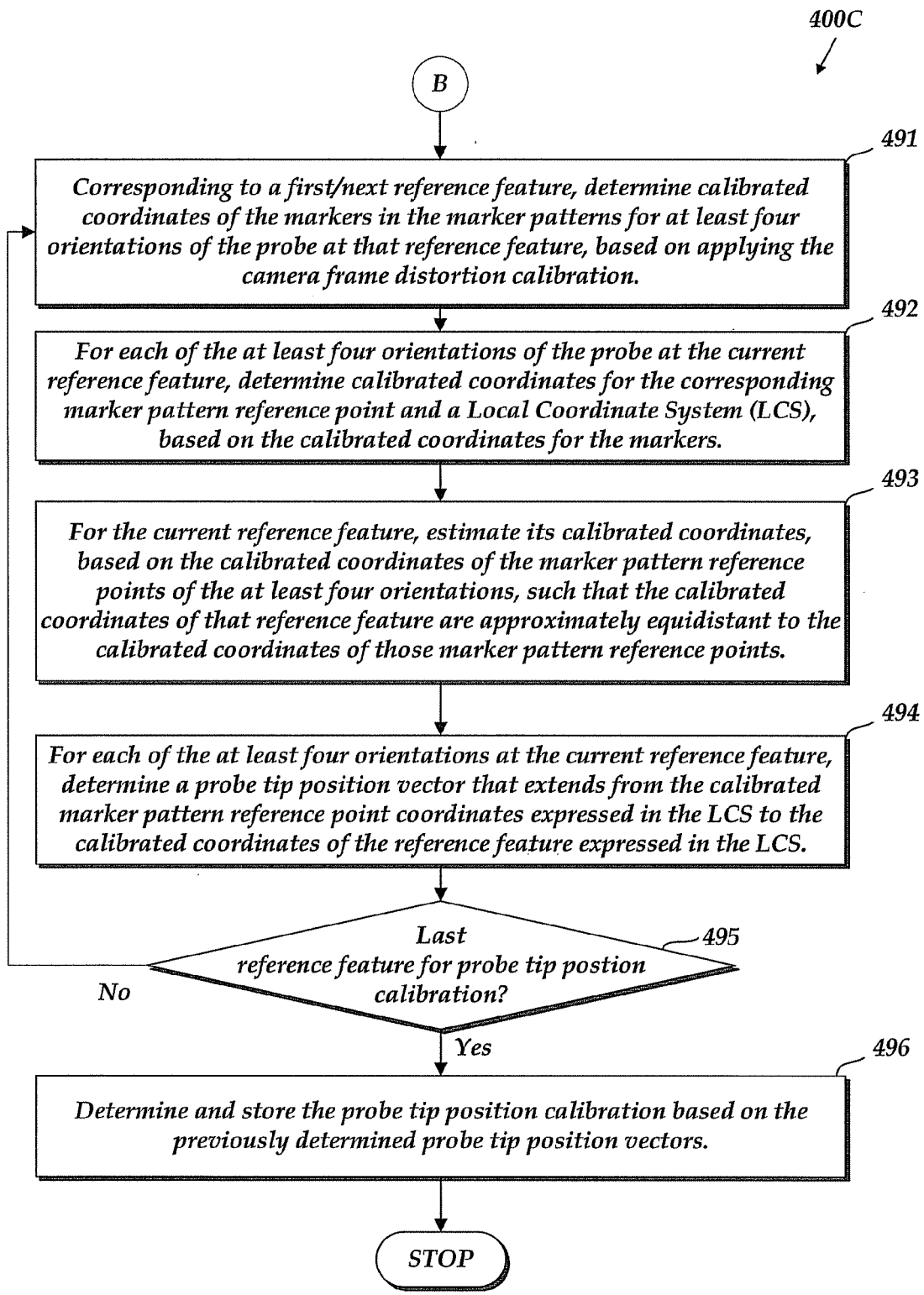

FIGS. 4A-4C are flow diagrams illustrating a first exemplary routine 400 according to this invention for global calibration of a multi-view vision-based touch probe system. As shown in FIG. 4A, at a block 405 a manual touch probe (e.g. probe 140) is provided which comprises a marker pattern (e.g. marker pattern 150) including at least three probe markers (e.g. markers 151A, etc.) At a block 410, a multi-view triangulation system (e.g. stereo vision system 120) is provided which is operable to determine first-level three dimensional coordinates for a probe marker based on images from at least two respective views (e.g. cameras 130A and 130B). "First-level" coordinates means the determined coordinates that may include some level of camera frame distortion errors. At a block 415, a reference object (e.g. the portable calibration jig 160) is provided comprising a plurality of probe tip positioning reference features having known geometric relationships between the reference features (e.g. the reference features RFn.)

At a block 420, the probe tip (e.g. the probe tip 144) is constrained with respect to translation at a first/next reference feature. At a block 425, the touch probe is oriented in a first/next orientation and triangulation images are acquired. At a block 430, the first-level three dimensional coordinates are determined for each of the markers in the marker pattern (e.g. the cloud CLD1 of FIG. 3), based on the triangulation images. In the embodiment shown in FIGS. 4A and 4B, at a block 435, the first-level three dimensional coordinates are analyzed for each of the probe markers in the marker pattern to determine the first-level three dimensional coordinates for a marker pattern reference point for the current orientation (e.g. the reference point C1 of orientation 1 of FIG. 3). The analysis may comprise PCA or centroid calculations, or the like, as outlined above.

At a decision block 440, a determination is made as to whether the last orientation of the touch probe has been provided for the current reference feature. If the last orientation has not been reached, then the routine returns to the block 425. If the last orientation has been reached, then the routine continues to a decision block 445. In various embodiments, at least four orientations are provided for each reference feature. At decision block 445, a determination is made as to whether the current reference feature is the last reference feature to be used for calibration. If it is not the last reference feature, then the routine returns to block 420. If it is the last reference feature, then the routine continues to a block 450. In various embodiments, at least four reference features are provided.

At block 450, for each reference feature, its first-level coordinates are estimated, based on the first-level coordinates of the marker patterns corresponding to at least four orientations of the probe at that reference feature, such that the estimated first-level coordinates of that reference feature are approximately equidistant to each of the corresponding marker patterns. In one embodiment, the first-level coordinates of the reference feature are estimated by fitting a sphere to the corresponding first-level marker pattern reference points found by the operations of block 435 (e.g. the reference points C1-C4), and using the center of the sphere (e.g. the center S of the sphere 310) as the first-level coordinates of the reference feature. The routine then continues to a point A, which is continued in FIG. 4B.

As shown in FIG. 4B, from the point A the routine continues to a block 455. At block 455, a first-phase camera frame distortion characterization is determined for distortions included in the first-level three dimensional coordinates, based on comparing the known geometric relationships between the reference features to corresponding geometric relationships that are based on the estimated first-level coordinates of the reference features. Exemplary methods of determining the first-level camera frame distortion characterization is described in greater detail below. The routine then continues to a decision block 460, where it is decided whether a more accurate "next-phase" camera frame distortion characterization (e.g. a second- or third-phase characterization) is to be determined. In one embodiment, this decision is based on determining whether the comparison made in the operations of block 455, and/or the resulting first-phase camera frame distortion characterization, are indicative of significant camera frame distortion errors (e.g. coordinate errors above a predetermined threshold). If it is decided that a more accurate "next-phase" camera frame distortion characterization is required, then the operations of blocks 465, 470, and 475 are performed. Otherwise, the routine continues at block 480, as described further below.

To determine a more accurate "next-phase" camera frame distortion characterization, in the embodiment shown in FIG. 4B, at block 465, for each reference feature, next-level coordinates are determined for the marker pattern reference points corresponding to at least four orientations of the probe at that reference feature, based on applying the first-phase camera frame distortion characterization to the markers in the marker patterns. For example, in one embodiment, the locations of the reference points C1-C4 are recalculated based on next-level coordinates for the markers in the clouds CLD1-CLD4, "Next-level" coordinates means the coordinates are at least partially corrected for camera, frame distortion errors, based on the first- or most-recent-phase camera frame distortion characterization. It will be appreciated that the first- or most-recent-phase distortion characterization may be applied to the 3D positions determined from the triangulation image data acquired by operations at the block 425. It is not necessary to acquire new triangulation images.

At block 470, for each reference feature, its next-level coordinates are estimated based on the next-level coordinates of the corresponding marker pattern reference points determined in the operations of block 465, such that the estimated next-level coordinates of that reference feature are approximately equidistant to the next-level coordinates of each of the marker pattern reference points. Operations at block 470 may be analogous to the those outlined above for block 450.

At block 475, a next-phase camera frame distortion characterization is determined for scale distortions included in next-level 3D coordinates, based on comparing the known geometric relationships between the reference features to corresponding geometric relationships that are based on the estimated next-level coordinates of the reference features. Exemplary methods of determining the next-level camera frame distortion characterization may be analogous to those used for the operations of block 450, and are described in greater detail below. The routine then returns to the decision block 460.

If it is decided at decision block 460 that a more accurate "next-phase" camera frame distortion characterization is not required, then the routine jumps to block 480, where the final camera frame distortion calibration is provided (e.g. determined and stored), based on the most-recent-phase camera frame distortion characterization (e.g. the first- or second-phase characterization, etc.). In various embodiments, the final camera frame distortion calibration may take a form identical to the most-recent-phase camera frame distortion characterization (e.g. an identical set of parameters). However, in various other embodiments, the final camera frame distortion calibration may take the form of a look-up table, or some other form derived from most-recent-phase camera frame distortion characterization. The routine then continues to a point B, which is continued in FIG. 4C.

FIG. 4C includes a portion of the global calibration routine 400 that determines the final probe tip position calibration that is used to correct probe form errors. As shown in FIG. 4C, from the point B the routine continues to a block 491. At block 491, corresponding to a first/next one of the reference features, calibrated coordinates of the markers in the marker patterns are determined for at least four orientations of the probe at that reference feature, based on applying the camera frame distortion calibration. "Calibrated coordinates" means the coordinates are corrected for camera frame distortion errors, based on the final camera frame distortion calibration (or based on the most-recent-phase camera frame distortion characterization, which may provide approximately the same coordinate accuracy).

At a block 492, for each of tire at least four orientations of the probe at the reference feature of block 491 (the current reference feature), calibrated coordinates for the corresponding marker pattern reference point are determined, as well as a Local Coordinate System (LCS) based on the calibrated coordinates for the markers. In one embodiment, the LCS may be established by PCA, as described above with reference to FIG. 2.

At a block 493, for the current reference feature, its calibrated coordinates are estimated based on the calibrated coordinates of the marker pattern reference points determined for at least four orientations in the operations of block 492, such that the calibrated coordinates of that reference feature are approximately equidistant to the calibrated coordinates of the marker pattern reference points. In one embodiment, the reference point in each LCS is the LCS origin. However, another reference point may be used in other embodiments, provided that it has the same coordinates in each LCS.

At a block 494, for each of the at least four orientations at the current reference feature, a probe tip position vector is determined that extends from the calibrated marker pattern reference point coordinates, as expressed in the LCS, to the calibrated coordinates of the reference feature estimated in the operations of block 493, as expressed in the LCS (e.g. vectors analogous to the vectors PV1-PV4 in FIG. 3 are determined). The routine then continues to a decision block 495, where a determination is made as to whether the current reference feature is the last reference feature to be analyzed for the probe tip position calibration. In one embodiment, this decision may be based on comparing the probe tip position vectors determined in the operations of block 494, and determining whether their corresponding tip positions vary by a significant amount from one another, either in a statistical sense or in terms of the distance between their tip locations. In other embodiments, it may simply be decided to use all available reference positions. In any case, if the current reference feature is not the last reference feature to be used for the probe tip position calibration, then the routine returns to block 491. Otherwise, the routine continues to a block 496.

At block 496, the probe tip position calibration is provided (e.g. determined and stored) based on the previously determined probe tip position vectors, and the routine ends. In one embodiment, the previously determined probe tip position vectors (e.g. vectors analogous to PV1-PV4 in FIG. 3) may be averaged to provide a probe tip position calibration vector (e.g. a vector analogous to the vector PV in FIG. 2). However, in various embodiments, it may be more accurate to determine a probe tip position calibration vector by a more sophisticated method such as a weighted mean, robust averaging (including outlier detection), geometric or arithmetic-geometric means, clustering approaches or other statistical, geometric or heuristic methods, based on the previously determined probe tip position vectors.

As noted above, the routine 400 of FIGS. 4A and 4B performs global calibration for a multi-view vision-based touch probe system. To summarize, roughly speaking, the operations of blocks 405-445 provide image data used throughout the calibration routine, the operations of blocks 405-480 provide camera frame distortion calibration; and the operations of blocks 491-496 provide probe tip position calibration. It should be appreciated that in the routine 400, the camera frame distortion calibration (e.g. the results of the operations of blocks 405-480) comprises an iterative calibration process that depends on the use of a touch probe with a tip. Nevertheless, it is independent of any probe form distortion errors, and uses a set of calibration images wherein the only relevant features in the images are the markers on the touch probe. Furthermore, the probe tip position calibration operations (e.g. the operations of blocks 491-496) depend on the results of the camera frame distortion calibration, and also use a set of calibration images wherein the only relevant features in the images are the markers on the touch probe. When the same probe tip is used throughout the entire global calibration procedure, particular efficiency results from the fact that the images used by the probe tip position calibration operations are from the same set of images used by the camera frame distortion calibration operations. Various other aspects of the routine 400 will be described in more detail below with reference to the relevant blocks.

With regard to the blocks 450 and/or 470, as noted above, in one embodiment their operations may include, for each reference feature, fitting a sphere (e.g. sphere 310) to reference points of the clouds of marker coordinates (e.g. the reference points C1-C4 of the marker clouds CLD1-CLD4, as determined by PCA, or centroid calculation, or the like). The center of each such sphere provides an estimate of the location of the corresponding reference feature, which coincides with the actual location of the constrained probe tip. However, in other embodiments according to this invention, a sphere may be fit to the locations of a particular marker (e.g. marker 151A) in each of the marker clouds. In essence, that particular marker then becomes the "reference point" for the marker cloud. In general, this will provide a less accurate estimate of the reference feature (and probe tip) location than "statistically determined" reference points (e.g. the reference points C1-C4 as determined by PCA or centroid calculations). However, if a separate sphere is fit to each of the individual markers in the marker pattern, and if an average or other meaningful statistical or geometric representation of the centers of those spheres is then used as the estimate of the reference feature (and probe tip) location, then similar accuracy may be achieved.

As will be described in more detail below, in one embodiment, in order to characterize camera frame distortion errors, three scaling coefficients are applied to the three axes of the world coordinate system. The world coordinate system may be defined by stereo calibration of the two cameras 130A and 130B. One basic assumption of this process is that the three-dimensional position measurements obtained by the stereo vision system contain errors that can be modeled by the scaling coefficients applied to each axis of the world coordinate system.

With regard to the blocks 455 and/or 475, as noted above, in various embodiments their operations may include determining a first- or next-phase camera frame distortion characterization for scale distortions included in first- or next-level 3D coordinates, based on comparing the known geometric relationships between the reference features to corresponding geometric relationships that are based on the estimated next-level coordinates of the reference features. In one embodiment, the end result of a camera frame distortion characterization is a set of scaling parameters that characterize and/or compensate for camera frame distortion errors in the system's measurement volume, such that estimated/measured locations are as close as possible to the "true" locations. A portable calibration jig (e.g. the jig 160) provides the "true" reference dimensions or relationships that govern determination of the camera, frame distortion characterization and/or scaling parameters. Some examples of equations for finding an exemplary set of scaling coefficients are described below, in the equations the "current-level" coordinates of the centers of the fitted spheres at each of four reference features RF1-RF4 are designated as (x1,y1,z1), (x2,y2,z2), (x3,y3,z3) and (x4,y4,z4) respectively. Furthermore, the known "true" distances d1-d6 between the reference features RF1-RF4 are defined as follows: d1=RF1 to RF2, d2=RF2 to RF3, d3=RF1 to RF3, d4=RF1 to RF4, d5=RF2 to RF4 and d6=RF3 to RF4. It will be appreciated that the following equations are directed to a portable calibration jig with four reference features. However an analogous method may be applied using a portable calibration jig with a larger number of reference features, with the only change being a larger number of constraint equations (i.e. known distances between the various reference features).

The following equations are directed toward an embodiment that finds three scaling coefficients (a, b, c), one linear scaling coefficient of scale factor for each axis of the world coordinate system, that make the distances between the estimated reference feature coordinates as close as possible to the "true" distances between the reference features RF1-RF4 in the portable calibration jig 160. For example, for the distance d1, it is desired to fulfill the equality:

$$\sqrt{(ax2-ax1)^2+(by2-vy1)^2+(cz2-cz1)^2}=d1 \quad \text{(Eq. 1)}$$

After squaring and rearranging EQUATION 1:

$$a^2(x2-x1)^2+b^2(y2-y1)^2+c^2(z2-z1)^2=d1^2 \quad \text{(Eq. 2)}$$

Similar equations can be formulated for all six distances d1-d6 and expressed in the following matrix form:

$$\begin{bmatrix} (x2-x1)^2 & (y2-y1)^2 & (z2-z1)^2 \\ (x3-x2)^2 & (y3-y2)^2 & (z3-z2)^2 \\ (x1-x3)^2 & (y1-y3)^2 & (z1-z3)^2 \\ (x4-x1)^2 & (y4-y1)^2 & (z4-z1)^2 \\ (x4-x2)^2 & (y4-y2)^2 & (z4-z2)^2 \\ (x4-x3)^2 & (y4-y3)^2 & (z2-z1)^2 \end{bmatrix} \cdot \begin{bmatrix} a^2 \\ b^2 \\ c^2 \end{bmatrix} = \begin{bmatrix} d1^2 \\ d2^2 \\ d3^2 \\ d4^2 \\ d5^2 \\ d6^2 \end{bmatrix} \quad \text{(Eq.3)}$$

The above is an over-determined system of linear equations in the unknowns $[a^2, b^2, c^2]^T$ which can be solved using standard methods (e.g. matrix pseudo-inverse, singular value decomposition), producing a least-squares solution for the scaling coefficients (a, b, c).

It will be appreciated that not all six equations are needed to solve for the three parameters $[a^2, b^2, c^2]^T$; and in one embodiment four equations are sufficient. Therefore, some of the known distances in the portable calibration jig 160 can be ignored as long as all of the coordinates of the reference features RF1-RF4 that are used are present on the left side of the matrix equation. However, using more constraints (more known distances) will, in some implementations, make the calibration results more robust and accurate due to the "averaging" of potential measurement errors or inaccuracies.

It will be appreciated that according to the principles of this invention, it is not necessary to align, the portable calibration jig with respect to the world coordinate system. In general, it can be placed anywhere in the system's measurement volume, although locating the reference features to span most or all of the measurement volume may be advantageous in various embodiments.

In other embodiments, more complex camera frame distortion errors may be modeled and corrected using scaling parameters based on a non-linear error model. The following equations are directed toward an embodiment that finds 21 "nonlinear" scaling parameters, using a portable calibration jig that includes a sufficient number of suitably arranged reference features. In particular, the associated model assumes non-linear distortions along the x, y and z axes, according to EQUATION 4:

$$x''=x'+ax'^2+bx'y'+cx'y^2+dx'z'+ex'z'^2+fy'+gz'+X_C$$

$$y''=y'+hy'^2+iy'x'+jy'x^2+ky'z'+ly'z'^2+mx'+nz'+Y_C$$

$$z''=z'+oz'^2+pz'x'+qz'x^2+rz'y'+sz'y'^2+tx'+uy'+Z_C \quad \text{(Eq. 4)}$$

where x'', y'' and z'' are corrected (undistorted) coordinates in the world coordinate system, $(X_C, Y_C, Z_{Cc})$ are the "current-level" coordinates of a reference point on the portable calibration jig (e.g. one of the reference features) as estimated/measured in the world coordinate system during calibration, and x', y' and z' are "current-level" coordinates estimated/measured in the world coordinate system relative to the selected reference point on the portable calibration jig. Thus:

$$x'=x-X_C$$

$$y'=y-Y_C$$

$$z'=z-Z_C \quad \text{(Eq. 5)}$$

One example of a suitable portable calibration jig that can be used for determining the 21 scaling parameters a-u includes nine or more non-colinear reference features distributed approximately in a plane that may be registered at a known angle with respect to the horizontal plane of the world coordinate system. Similar to the three-parameter case, based on the equations outlined above and a corresponding portable calibration jig having a sufficient number of suitably arranged reference features (e.g. the nine reference feature jig outlined above), it is possible to set up a system of linear equations to find the non-linear scaling parameters a-u according to known methods. In contrast to the three-parameter case described earlier, to allow applying linear least squares method to each world coordinate system axis separately, a "jig coordinate system" used to record the known reference feature coordinates for the nine reference feature jig has to be appropriately registered relative to the world coordinate system. The registration may be achieved via physical registration, or through preliminary triangulation measurements to determine appropriate coordinate transformations, or by a combination of the two.

Other known modeling methods and solutions are also usable for characterizing camera frame distortion errors according to this invention. It will be appreciated that the camera frame distortion error models and scaling parameter solutions outlined above are exemplary only and not limiting. It will also be appreciated that linear or lower-order non-linear models are more applicable when complex non-linear optical distortions due to the individual camera systems are not present in the triangulation images. Therefore, in some embodiments, either the individual camera systems are selected to be sufficiently free of optical aberrations, or image distortions in the individual camera systems are separately calibrated according to known methods, and the data of the triangulation images is then adjusted for individual image distortions according to known methods, prior to being used for the triangulation calculations included a global calibration method according to this invention.

With regard to the operations of block 465, in various embodiments the most robust and accurate calibration results are obtained by determining the next-level coordinates for the marker pattern reference points, based on applying the most-recent-phase camera frame distortion characterization to all the markers in the marker patterns, and determining the next-level coordinates for the reference points using PCA or centroid calculations, or the like, as previously outlined. However, when the camera frame distortion errors are not too severe or nonlinear, then it may be sufficient to directly adjust the previously determined coordinates of the marker pattern reference points themselves, based on the most-recent-phase camera frame distortion characterization. In this case, the method bypasses or eliminates the operations of adjusting the individual marker coordinates and repeating the calculations used to determine the previous reference point coordinates (e.g. PCA or centroid calculations, or the like).

In a test of an actual embodiment comprising a calibration jig similar to the portable calibration jig 160, and a routine similar to the routine 400 that determined linear scaling parameters similar to those outlined with reference to EQUATIONS 1-3, the method converged to provide accurate and stable global calibration results after approximately 10 iterations of operations corresponding to the blocks 460-475.

It will be appreciated that in an alternate embodiment, global calibration may be interrupted after the camera frame distortion calibration (e.g. the operations of blocks 405-480). Different probe tips may be utilized for different calibration functions. For example, a first probe tip may be used for the camera frame distortion calibration (e.g. the operations of blocks 405-480), and a second (different) probe tip which will be used for performing actual measurements may be installed in the touch probe body for performing the probe tip position calibration (e.g. the operations of blocks 491-496). However, in such a case, additional calibration images must be acquired in at least four orientations while the second probe tip is constrained against translation, and these additional calibration images must be used in the probe tip position calibration operations (e.g. in the operations of blocks 491-496). It will be appreciated that in this case, the camera frame distortion calibration depends on the use of the touch probe with the first tip, and is an iterative calibration process that is independent of any probe form distortion errors, and uses a set of calibration images wherein the only required features in the images are the markers on the touch probe. Furthermore, the second probe tip position calibration operations depend on the results of the camera frame distortion calibration (e.g. the results of the operations of blocks 405-480), and also use a set of calibration images wherein the only required features in the images are the markers on the touch probe. Thus, certain advantages of a global calibration method according to this invention are retained, even though additional images are required for the probe tip position calibration of the second probe tip.

Figure 5:
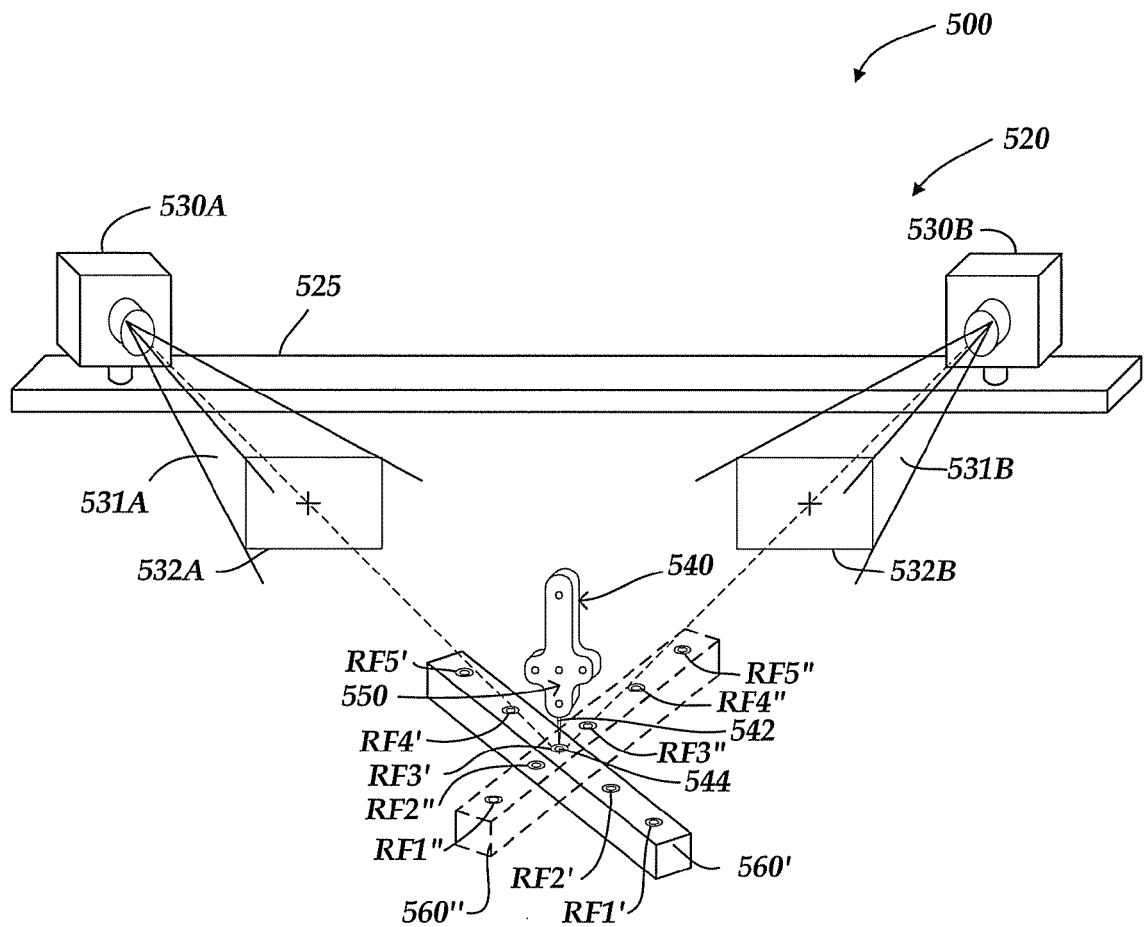
FIG. 5 is a diagram of a second exemplary embodiment of a stereo vision touch probe system calibration arrangement.

FIG. 5 is a diagram of a second exemplary embodiment of a multi-view touch probe system calibration arrangement 500, which may also be referred to as a stereo-vision touch probe system calibration arrangement 500, since this particular embodiment uses a typical dual-camera stereo vision arrangement. The calibration arrangement 500 is generally similar to the calibration arrangement 100 of FIG. 1, and may be similarly understood. Similarly numbered elements in the 1XX and 5XX series of numbers (e.g. the elements 130A and 530A, etc.) may be similar or identical in form or operation except as otherwise indicated below.

A portable calibration jig 560 and its reference features RF1-RF5 are shown in a first instance 560' and a second instance 560" at respective first and second exemplary imaging positions in FIG. 5. Tire portable calibration jig 560 is simpler than the portable calibration jig 160 shown in FIG. 1. However, like the portable calibration jig 160, the portable calibration jig 560 acts as reference object during calibration operations, and supports calibration of both camera frame distortion errors and probe form errors. The first instance 560' of the portable calibration jig 560 includes first instances RF1'-RF5' of the five corresponding reference features RF1-RF1, which may be any appropriate type of reference feature previously disclosed herein. In particular, the distance relationships between the reference features RF1-RF5 are precisely known by independent measurement, and the probe tip 544 can be placed at each instance of a reference position and constrained against translational motion while the body of the probe 540 is rotated around the constrained position of the probe tip 544. During calibration operations, it may be desirable to provide the portable calibration jig 560 in at least two imaging positions or poses for the stereo vision touch probe system 520, as illustrated in FIG. 5. Preferably, the orientation of the portable calibration jig 560 is significantly different in the at least two imaging positions, such that the instances of the reference features RF1-RF5 are distributed over a significant portion of the measuring volume in the various resulting images as illustrated by the reference feature instances RF1'-RF5' and RF1"-RF5" in FIG. 5. With such orientations, the portable calibration jig 560 may be used in place of the portable calibration jig 160 during calibration operations, in a manner similar to that previously described, and/or in the manner disclosed further below.

Figure 6A:
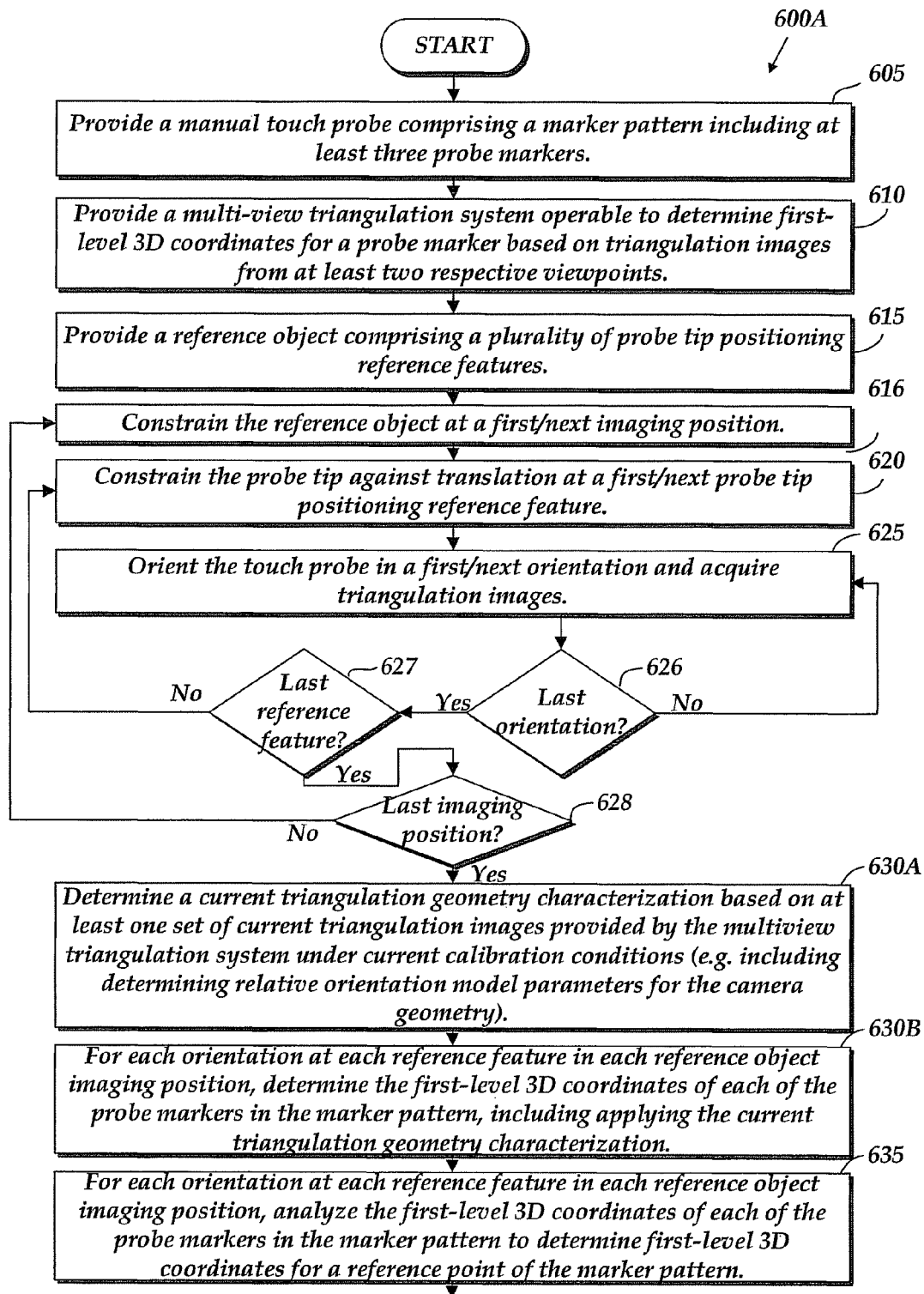
FIGS. 6A-6C are flow diagrams illustrating a second exemplary routine according to this invention for global calibration of a multi-view vision-based touch probe system.
Figure 6B:
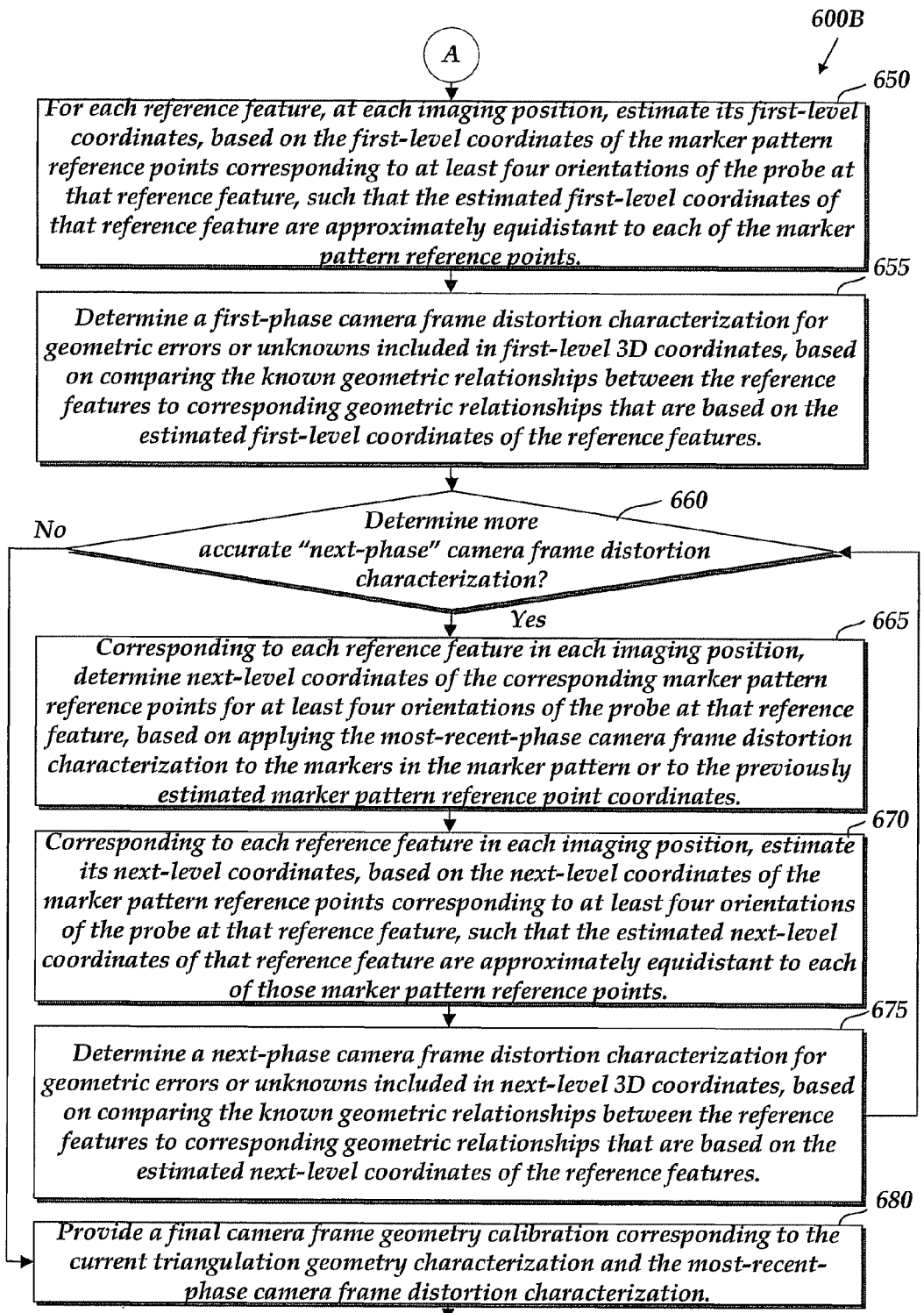
Figure 6C:
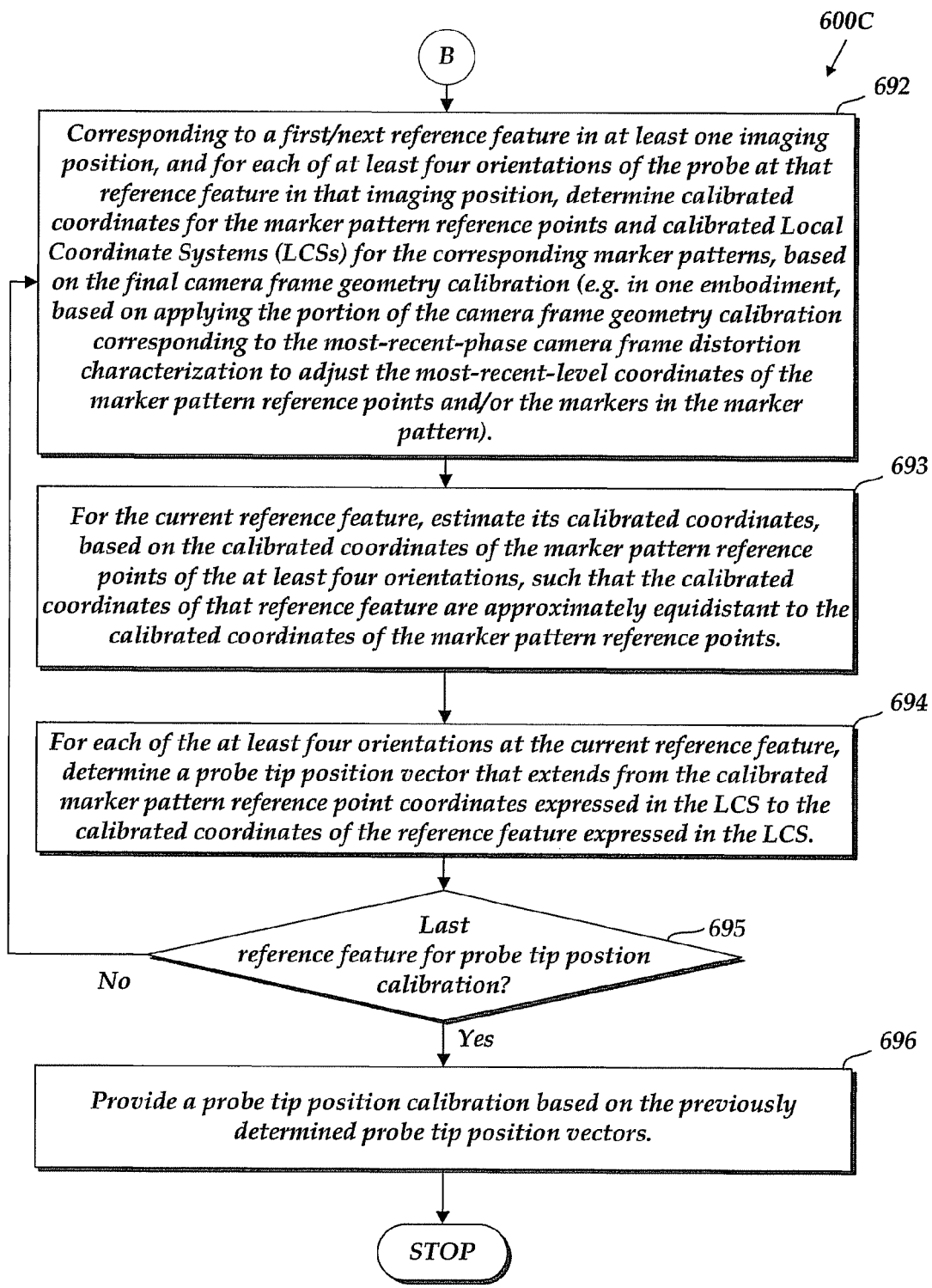

FIGS. 6A-6C are flow diagrams illustrating a second exemplary routine 600 (600A-600C) according to this invention for global calibration of a multi-view vision-based touch probe system. The global calibration routine 600 is generally similar to the global calibration routine 400 of FIGS. 4A-4C, and may be similarly understood, except the global calibration routine 600 differs from the global calibration routine 400 in that it includes determining a current triangulation geometry characterization under the current calibration conditions. Similarly numbered elements in the 4XX and 6XX series of numbers (e.g. the elements 420 and 620, etc.) may be similar or identical in function, except as otherwise indicated below.

As shown in FIG. 6A, at a block 605 a manual touch probe (e.g. probe 540) is provided which comprises a marker pattern (e.g. marker pattern 550) including at least three probe markers (e.g. markers 551A, etc.) At a block 610, a multi-view triangulation system (e.g. stereo vision system 520) is provided which is operable to determine first-level three dimensional coordinates for a probe marker based on a set of triangulation images comprising respective images of that probe marker from at least two respective viewpoints (e.g. cameras 530A and 530B). At a block 615, a reference object (e.g. the portable calibration jig 560) is provided, comprising a plurality of probe tip positioning reference features having known geometric relationships between the reference features (e.g. the reference features RFn). At a block 616, the reference object is constrained at a first/next imaging position (e.g. in respective iterations, at respective imaging positions corresponding to the instances 560' and 560" shown in FIG. 5). At a block 620, the probe tip (e.g. the probe tip 544) is constrained against translation at a first/next reference feature. At a block 625, the touch probe is oriented in a first/next orientation and triangulation images are acquired.

At a decision block 626, a determination is made as to whether the last orientation of the touch probe has been provided for the current reference feature. If the last orientation has not been reached, then the routine returns to the block 625. If the last orientation has been reached, then the routine continues to a decision block 627. In various embodiments, at least four orientations are provided for each reference feature. At decision block 627, a determination is made as to whether the current reference feature is the last reference feature to be used for calibration at the current imaging position. If it is not the last reference feature, then the routine returns to block 620. If it is the last reference feature, then the routine continues to a block 628. At decision block 628, a determination is made as to whether the reference object is positioned at the last imaging position. If it is not at the last imaging position, then the routine returns to block 616. If it is at the last imaging position, then the routine continues to a block 630A. In various embodiments, if the reference object is a simple linear reference object (e.g. similar to the calibration jig 560), at least one and preferably two imaging positions may be provided, with the reference object providing at least two reference features having a known distance relationship between them, if the reference object provides a 2D or 3D distribution reference features (e.g. similar to the calibration jig 160 shown in FIG. 1) a single imaging position may be sufficient, as previously described.

At a block 630A, a current triangulation geometry characterization (e.g. relative orientation model parameters for the cameras) is determined based on at least one set of current triangulation images provided by the multi-view triangulation system under the current calibration conditions. In contrast, in block 430 of the calibration routine 400 the triangulation geometry characterization was implicitly provided by recalling a previously stored triangulation geometry characterization from a memory device of the multi-view triangulation system. However, in various embodiments when the triangulation geometry of a multi-view triangulation system is not sufficiently well known and/or stable, or when the highest levels of accuracy are desired, it may be advantageous to provide the triangulation geometry characterization based on analysis of triangulation images acquired under approximately the current calibration and operating conditions (e.g. following any physical set-up disturbances, significant temperature changes, and the like). A current triangulation geometry characterization may best correspond to the actual triangulation geometry used for subsequent measurements and may provide smaller measurement errors or uncertainty In one embodiment, the at least one set of current triangulation images used at block 630A may comprise one or more sets (e.g. pairs) of triangulation images acquired during the operations of block 625. In another embodiment, the at least one set of current triangulation images used at block 630A may be acquired during the operations of block 630A, for example by acquiring triangulation images while moving or sweeping the touch probe freehand throughout the measurement volume. In either case, the analysis that determines the current triangulation geometry characterization may comprise a known, method such as relative orientation analysis, which is described in greater detail below with reference to FIG. 8, or other similarly effective methods. Once a current triangulation geometry characterization is determined, the routine continues at a block 630B.

At the block 630B, in one embodiment, for each orientation at each reference feature in each reference object imaging position, the first-level 3D coordinates of each of the probe markers in the marker pattern are determined based at least partly on the current triangulation geometry characterization provided at block 630A. The manner of determining the first-level 3D coordinates in block 630B may substantially correspond to the manner of determining the first-level 3D coordinates used at block 430 of the routine 400, where the use of a triangulation geometry characterization was implicit. At a block 635, for each orientation at each reference feature in each reference object imaging position, the first-level 3D coordinates of each of the probe markers in the marker pattern are analyzed to determine first-level 3D coordinates for a reference point of the marker pattern (e.g. in a manner previously outlined for block 435 of the routine 400). The routine then continues to a point A, which is continued in FIG. 6B.

In FIG. 6B from the point A the routine continues to a block 650, where for each reference feature at each imaging positron, its first-level coordinates are estimated, based on the first-level coordinates of the marker pattern reference points corresponding to at least four orientations of the probe at that reference feature, such that the estimated first-level coordinates of that reference feature are approximately equidistant to each of the mailer pattern reference points (e.g. in a manner previously outlined for block 450 of the routine 400).

The routine then continues at block 655, where a first-phase camera frame distortion characterization is determined for geometric errors or unknowns included in first-level 3D coordinates, based on comparing the known geometric relationships between the reference features to corresponding geometric relationships that are based on the estimated first-level coordinates of the reference features. As previously indicated, in this disclosure the term "camera frame distortion" refers to a coordinate system frame, not a physical frame. In various embodiments, the camera frame distortion characterization may be similar or identical to the camera frame distortion characterization outlined previously for block 455 of the routine 400, and may be determined in an analogous manner (e.g. in a manner analogous to that outlined with reference to EQUATIONS 1-3, or EQUATIONS 4-5, for example.) However, in some embodiments the operations of block 630A may provide a current triangulation geometry characterization that eliminates various camera frame distortion, error sources that might otherwise be present when using a recalled "non-current" triangulation geometry characterization, as may have been used in some embodiments of the routine 400. Thus, when using a current triangulation geometry characterization, it may be sufficient and/or preferable to determine a simpler camera frame distortion characterization that makes the distances between the estimated reference feature coordinates as close as possible to the "true" or known distances between the reference features, for reasons discussed in greater detail below with reference to FIG. 7.

From block 655, the routine continues to a decision block 660, where it is decided whether a more accurate "next-phase" camera frame distortion characterization (e.g. a second- or third-phase characterization) is to be determined. Similar to the discussion to the operations of the decision block 460 of the routine 400, in one embodiment, this decision is based on determining whether the comparison made in the operations of block 655, and/or the resulting first-phase camera frame distortion characterization, are indicative of significant camera frame scaling or distortion errors (e.g. coordinate errors or characterization parameters that exceed a predetermined threshold). If it is decided that a more accurate "next-phase" camera frame distortion characterization is required, then the operations of blocks 665, 670, and 675 are performed. Otherwise, the routine continues at block 680, as described further below.

To determine a more accurate "next-phase" camera frame distortion characterization, in the embodiment shown in FIG. 6B, at block 665, corresponding to each reference feature in each imaging position, next-level coordinates are determined for the marker pattern reference points corresponding to at least four orientations of the probe at that reference feature, based on applying the first-phase (or most-recent-phase camera frame distortion characterization to the markers in the marker patterns (e.g. to determine the next-level coordinates for the marker pattern reference points in a manner analogous to that previously outlined for block 465 of the routine 400), or directly to the marker pattern reference point coordinates previously determined at block 635. For example, the later alternative may be sufficient and/or preferred when the most-recent-phase camera frame distortion, characterization consists exclusively of linear terms (e.g. one or more first-order scaling coefficients, as described further below with reference to FIG. 7), and the former alternative may be preferred if the camera frame distortion characterization includes nonlinear terms. As previously indicated, in this disclosure "next-level" coordinates means the coordinates are at least partially corrected for camera frame scaling or distortion errors, based on the first- or most-recent-phase camera frame distortion characterization. It will be appreciated that the first- or most-recent-phase camera frame distortion characterization may be applied to the 3D positions determined from the triangulation image data acquired by operations at the block 625. It is not necessary to acquire new triangulation images.

At block 670, corresponding to each reference feature in each imaging position, its next-level coordinates are estimated based on the next-level coordinates of the marker pattern reference points corresponding to at least four orientations of the probe at that reference feature as provided in the operations of block 665, such that the estimated next-level coordinates of that reference feature are approximately equidistant to each of those marker pattern reference points.

At block 675, a next-phase camera, frame distortion characterization is determined for geometric errors or unknowns included in next-level 3D coordinates, based on comparing the known geometric relationships between the reference features to corresponding geometric relationships that are based on the estimated next-level coordinates of the reference features. The routine then returns to the decision block 660.

If it is decided at decision block 660 that a more accurate "next-phase" camera frame distortion characterization is not required, then the routine jumps to block 680, where a final camera frame geometry calibration comprising portions corresponding to the current triangulation geometry characterization and portions corresponding to the most-recent-phase camera frame distortion characterization, is determined and stored, hi various embodiments, the final camera frame geometry calibration may take a form comprising the current, triangulation geometry characterization and the most-recent-phase camera frame distortion characterization. However, in various other embodiments, the final camera frame geometry calibration may take a form including a look-up table, or some other form derived from the current triangulation geometry characterization and/or the most-recent-phase camera frame distortion characterization. The routine then continues to a point B, which is continued in FIG. 6C.

FIG. 6C includes a portion of the global calibration routine 600 that determines the final probe tip position calibration that is used to correct probe form errors. As shown in FIG. 6C, from the point B the routine continues to a block 692.

At block 692, corresponding to a first/next reference feature in at least one imaging position, and for each of at least four orientations of the probe at that reference feature in that imaging position, determine calibrated coordinates for the marker pattern reference points and calibrated Local Coordinate Systems (LCSs) for the corresponding marker patterns, based on the final camera frame geometry calibration. The LCS may be established by PCA, as described above with reference to FIG. 2, for example.

In one embodiment, this may be accomplished by applying the portion of the camera frame geometry calibration corresponding to the most-recent-phase camera frame distortion characterization to adjust the most-recent-level coordinates of the markers in each corresponding marker pattern to provide their calibrated coordinates, and to subsequently determine the corresponding calibrated coordinates for reference points, and LCSs based on those calibrated marker coordinates. This embodiment is approximately analogous to the combined operations of blocks 491 and 492 of the routine 400, and may be similarly understood. Tins embodiment may be preferred if the most-recent-phase camera frame distortion characterization includes nonlinear terms.

In another embodiment, this may be accomplished by applying the portion of the camera frame geometry calibration corresponding to the most-recent-phase camera frame distortion characterization to directly adjust the most-recent-level coordinates of the reference points of each corresponding marker pattern, to provide calibrated coordinates for the reference points. Similarly, as an alternative to determining a calibrated LCS based on calibrated coordinates for the markers in each corresponding marker pattern as outlined above, an uncalibrated LCS may be determined based on the most-recent-level coordinates of the markers of each corresponding marker pattern, and the portion of the camera frame geometry calibration corresponding to the most-recent-phase camera frame distortion characterization may be applied to directly adjust that LCS to provide a calibrated LCS. This embodiment may be sufficient or preferred if the most-recent-phase camera, frame distortion characterization includes only linear terms.

From block 692, the routine continues to the blocks 693, 694, 695 and 696, which are each respectively analogous or identical to the blocks 493, 494, 495 and 496 of the routine 400, and may be similarly understood based on that previous description. Further description of blocks 693, 694, 695 and 696 is not necessary.

Figure 7:
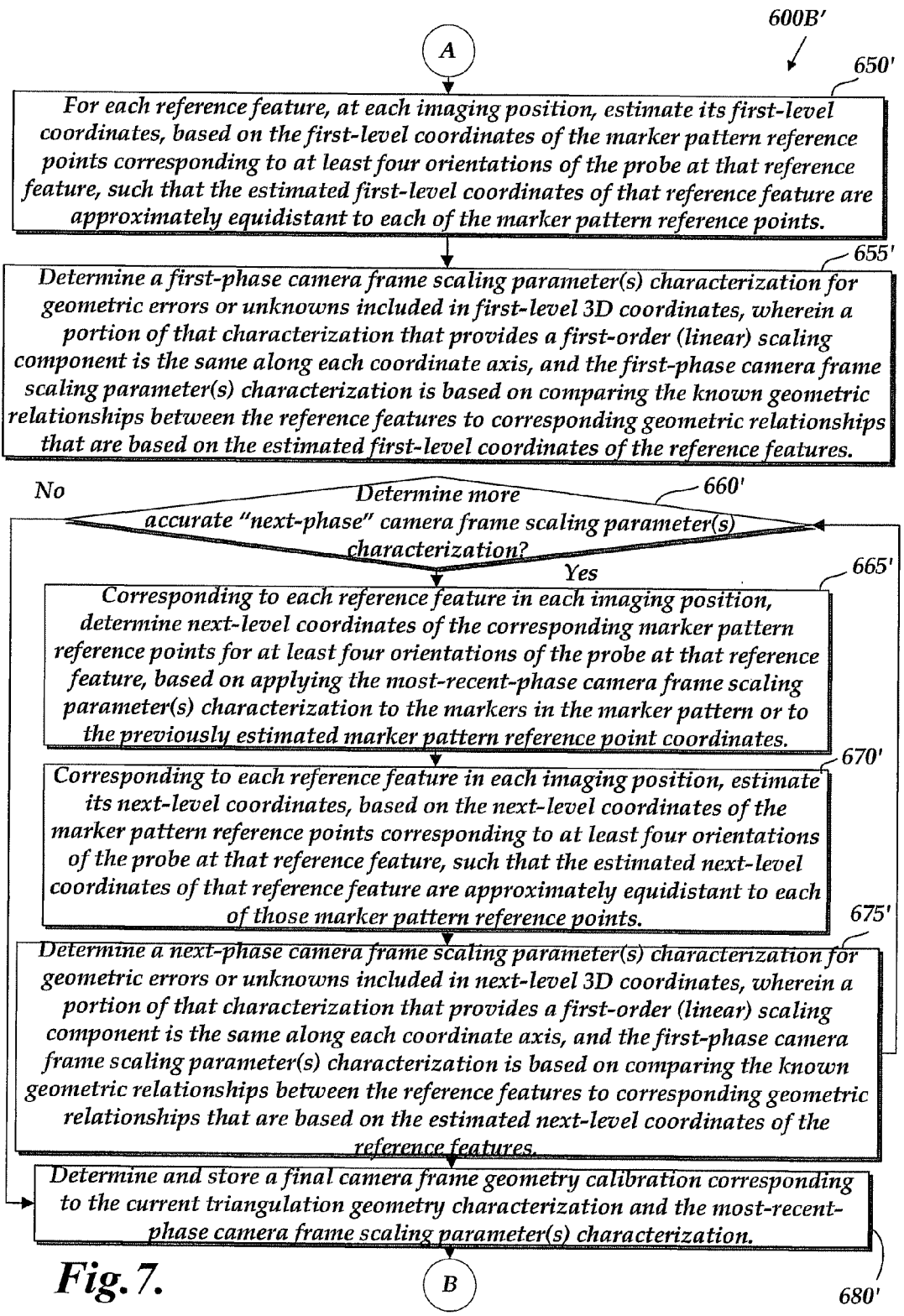
FIG. 7 is a flow diagram illustrating specific embodiments of certain blocks that may be used to implement the operations shown in FIG. 6B.

FIG. 7 is a flow diagram illustrating a set of operations 600B', including specific embodiments of certain blocks that may be used to implement the operations shown in FIG. 6B, in some embodiments of the routine 600. As shown in FIG. 7, from the point A the routine continues to a block 650', which is identical to the block 650 of FIG. 6B, and need not be further described.

The routine then continues at block 655', which is a specific implementation within the more general scope of operations outlined for the block 655 of FIG. 6B. In particular, as previously described, in some embodiments the operations of block 630A of FIG. 6A may provide a current triangulation geometry characterization that eliminates various camera frame distortion error sources that might otherwise be present when using a recalled "non-current" triangulation geometry characterization (e.g. as may have been used in some embodiments of the routine 400). Thus, when using a current triangulation geometry characterization, smaller or more predictable residual errors may remain and it may be sufficient and/or preferable to determine a simpler camera frame distortion characterization. In addition, when the current triangulation geometry characterization is provided by a method such as the relative orientation analysis described below with reference to FIG. 8, such a method may inherently provide a relatively symmetric error distribution. The operations at block 655' are based on these assumptions. Thus, at block 655', a first-phase camera frame scaling parameter characterization is determined for geometric errors or unknowns included in first-level 3D coordinates, wherein a portion of that characterization provides a first-order (linear) scaling component that is the same along each coordinate axis. The characterization is based on comparing the known geometric relationships between the reference features to corresponding geometric relationships that are based on the estimated first-level coordinates of the reference features, according to principles previously described with reference to EQUATIONS 1-3 and 4-5, except under the constraint that the first-order (linear) scaling components are the same along each coordinate axis.

It should be appreciated that in the operations 600B the terra "camera frame scaling parameter characterization" is used to connote a camera frame distortion characterization wherein the dominant geometric errors or unknowns that are characterized are associated with first order scale factor errors or unknowns. For example, when optical distortions in the cameras are minimal or previously corrected, a current triangulation geometry characterization may be relatively accurate, except that it may generally include an unknown scale factor or unknown scale factor error. In such a case, a first-order (linear) scaling component that is the same along each coordinate axis may be more physically appropriate and/or provide the unexpected benefit of limiting calibration errors throughout a measurement volume more effectively than a more complex characterization, which may be associated with a less stable or less repeatable convergence to a final set of characterization parameters.

In some embodiments, it may be sufficient and/or preferable for the camera frame scaling parameter characterization to consist of a single scaling parameter (e.g. a coefficient) that makes the distances between the estimated reference feature coordinates as close as possible to the "true" or known distances between the reference features. Such a scaling coefficient may be determined by a method analogous to that outlined with reference to EQUATIONS 1-3, except under the constraint that a=b=c. In such a case, EQUATION 3 simplifies to an analogous equation:

$$\begin{bmatrix} (x5'-x1')^2 & (y5'-y1')^2 & (z5'-z1')^2 \\ (x5''-x1'')^2 & (y5''-y1'')^2 & (z5''-z1'')^2 \end{bmatrix} \cdot [a^2] = \begin{bmatrix} d1^2 \\ d2^2 \end{bmatrix} \quad (\text{Eq. } 6)$$

where the "current-level" coordinates of the centers of the fitted spheres at each of four reference feature instances RF1', RF5', RF1" and RF5" are designated as (x1',y1',z1'), (x5',y5',z5'), (x1",y1",z1"), (x5",y5",z5"), respectively. Known "true" distances d1 and d2 between the reference features are defined as follows: d1=RF1' to RF5', and d2=RF1" to RF5". By analogy with the description of FIG. 5, it will be appreciated that these equations may be appropriate for a calibration using a portable calibration jig with two reference features RF1 and RF5, at two respective imaging positions (respectively indicated by the number of "prime" symbols on a reference feature). It will be appreciated that in the case described immediately above, the distances d1 and d2 will be equal, because they refer to the distance between the same pair of features in different imaging positions. However an analogous method may be applied using a portable calibration jig with a larger number of reference features and known distances, with the only change being a larger number of constraint equations (i.e. a larger number of known distances between the various reference features) contributing to a more accurate "average" for the scaling coefficient. In such a case, in general, there may be different distances (d1, d2, etc.) between different pairs of features.

From block 655', tire routine continues with the operations indicated by the blocks 660'-680'. These blocks are each analogous to a correspondingly numbered one of blocks 660-680 of FIG. 6B, and may generally be understood based on that related disclosure. The only difference is that each instance of the more general camera frame distortion characterization that is referred to the blocks 660-680 FIG. 6B, is limited to be a camera frame scaling parameter characterization in the blocks 660'-680', wherein a portion of that characterization provides a first-order (linear) scaling component that is the same along each coordinate axis, for reasons outlined above with reference to the block 655'. Thus, the blocks 660'-680' need not be further described. From block 680' the routine then continues to a point B, which is continued in FIG. 6C.

Figure 8:
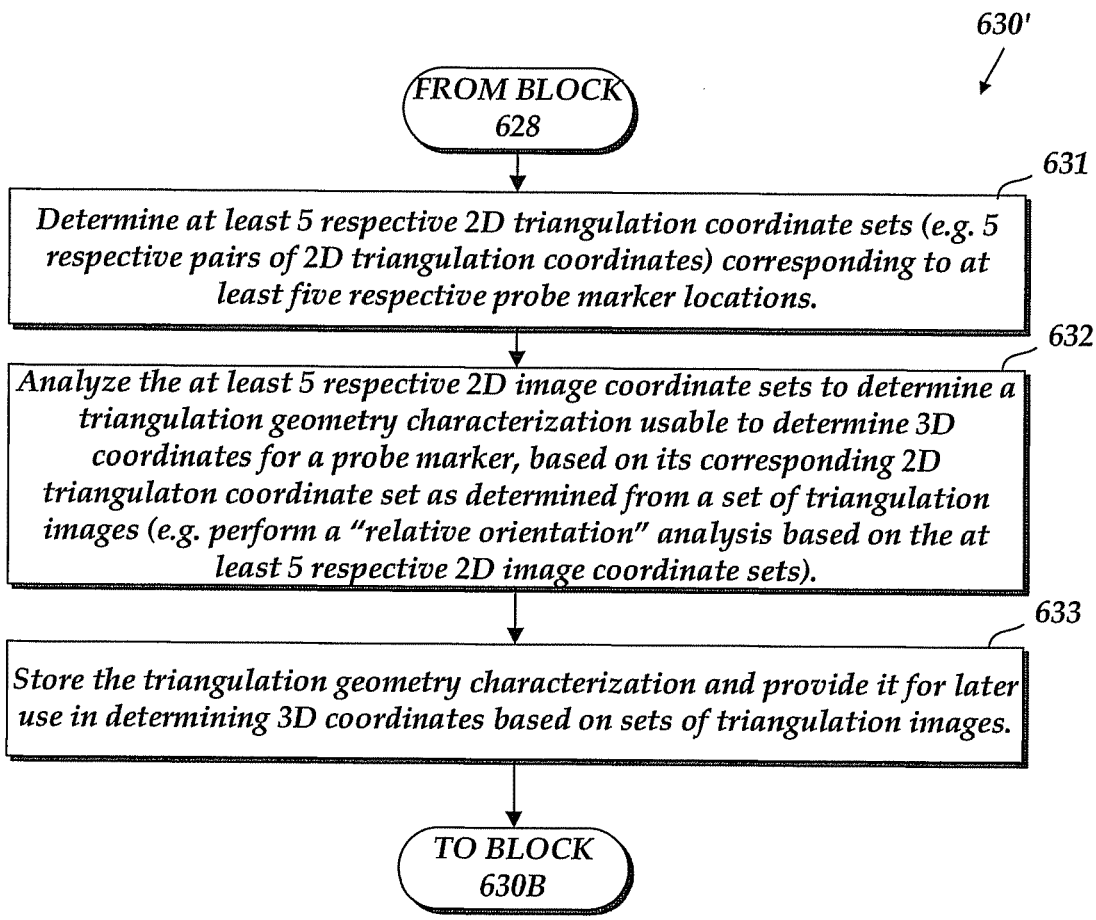
FIG. 8 is a flow diagram illustrating one exemplary set of operations usable in one embodiment the block 630A of FIG. 6A.

FIG. 8 is a flow diagram illustrating one exemplary set of operations 630A' usable in one embodiment of the block 630A of FIG. 6A. As shown in FIG. 8, from block 628 of FIG. 6A, operation continues at a block 631, where at least five respective 2D triangulation coordinate sets (e.g. image pixel coordinates having sub-pixel resolution) are determined corresponding to at least five respective probe marker locations. To clarify, a single 2D triangulation coordinate set may comprise image coordinates of the same probe marker imaged at nominally the same time, as determined in each image of a corresponding set of simultaneous (or nearly simultaneous) triangulation images provided by the multi-view triangulation system. Thus, five respective 2D triangulation coordinate sets may be determined based on five respective probe markers in a single set of triangulation images, or a single probe marker at five respective locations (in the measurement volume) in five respective sets of triangulation images, and so on.

The routine then continues to a block 632, where the at least five respective 2D triangulation coordinate sets are analyzed to determine a triangulation geometry characterization usable to determine 3D coordinates for a probe marker, based on its corresponding 2D triangulation coordinate set as determined from a set of triangulation images provided the multi-view triangulation system. In one embodiment, the analysis may comprise a known relative orientation analysis, such as that described in Horn, B. K. P. "*Relative Orientation,*" *International Journal of Computer Vision* Vol 4. No. 1, pp. 59-78, January 1990, or the like. Briefly, in various embodiments, relative orientation analysis considers the ray directions from different cameras to the same point in a shared imaging volume. Such "same points" may be referred to as tie points, or landmark points. The ray direction from a respective camera to a particular landmark point may be determined from its location (e.g. image coordinates) in that respective camera image. By analyzing the ray directions associated with triangulation images of at least five such landmark points, the relative positions and orientations of the different cameras may be determined, and a corresponding triangulation geometry characterization may be provided. Thereafter, the triangulation geometry may be used to determine the 3D coordinates of a point imaged in a set of triangulation images provided by those cameras. However, in the absence of additional information, those 3D coordinates will have a scale factor related to the length of the baseline between the different camera positions. It will be appreciated that the baseline between the different camera positions, and thus the associated scale factor, may initially be approximately known based on the nominal design and/or setup of tire multi-view triangulation system. However, if that baseline length is not precisely known, then the scale factor of the resulting 3D coordinates is not precisely known. A camera frame scaling parameter characterization as outlined with reference to FIG.

7, or more generally a camera frame distortion characterization as outlined with reference to FIGS. 6A-6C, augments or completes the triangulation geometry characterization outlined above by characterizing the scale factor precisely in terms of standard units of length (e.g. inches, meters, etc.), which provides a full camera frame geometry calibration (e.g. as indicated at block 680 of FIG. 6B).

From the block 632, operation continues at a block 633. At the block 633, the triangulation geometry characterization is stored and provided for later use in determining 3D coordinates based on sets of triangulation images. From the block 633, operation continues at the block 630B of FIG. 6A.

In some contexts, the descriptions of each of the FIGS. 6A-6C, 7 and 8, have indicated that certain operations may be based on providing and/or analyzing a minimal number of instances of probe marker locations, triangulation image sets, etc. It will be appreciated that, in general, when these operations provide and/or analyze a greater number of instances of probe marker locations, triangulation image sets, etc., then the resulting calibration accuracy may generally be improved. Conversely, in other contexts, the descriptions of the FIGS. 6A-6C and 7 have indicated that certain operations may be based on providing and/or analyzing each instance of an orientation, a probe marker, a reference feature, etc. It will be appreciated that, in some embodiments, the number of instances of an orientation, a reference feature, etc. that are provided and/or analyzed need not include each possible instance. As one example, in some embodiments described above it is indicated that the coordinates of each probe marker in a marker pattern are determined and/or analyzed to determine an associated marker pattern reference point, or LCS. However, in general, it is instead sufficient to determined and/or analyze the coordinates of as few as three probe markers in each marker pattern to determine an associated marker pattern reference point or LCS, as previously disclosed herein. When fewer than all possible instances of a probe marker, orientation, a reference feature, etc. are analyzed, the resulting calibration may be simpler and faster, and may provide sufficient accuracy for many applications. Such tradeoffs and modifications related to the methods disclosed herein may be determined by one of ordinary skill in the art (e.g. based on analysis and/or experiment) depending on the accuracy desired for an application.

The results of either the calibration routine 400 of FIGS. 4A-4C, or the calibration routine 600 of FIGS. 6A-6C, may be subjected to a verification routine that determines the resulting measurement accuracy. It will be appreciated that the results of either calibration routine may be used to analyze any respective set of triangulation images of a marker pattern and determine the corresponding respective measurement location of the probe tip at high speed. One exemplary verification routine may be performed as follows.

In some embodiments, respective sets of triangulation images corresponding to each respective orientation of the probe at each respective reference feature, to be used as described below, may be acquired by a separate set of operations. However, in one particularly advantageous embodiment, respective sets of triangulation images corresponding to each respective orientation of the probe at each respective reference feature, as obtained in the routine 400 or 600, are analyzed to determine a corresponding calibrated measurement location of the probe tip. For each respective reference feature, we may then determine a respective set of such measurement locations corresponding to each respective probe orientation. Ideally, each member of that respective set should indicate nearly the same measurement location, corresponding to the fixed measurement location of that reference feature. Then, for first and second such sets, measurement distances may be determined from each measurement location of the first set to all the measurement locations of the second set. Accordingly, for a first set of M measurement locations for a first reference feature, and a second set of N measurement locations for a second reference feature, M*N measurement distances may be determined. Thus, based on 10 respective images corresponding to 10 touch probe orientations at each of first and second reference features, 100 unique distance measurements may be provided, representing a wide variety of combinations of probe orientations, etc. In general, each unique measurement distance will provide a random residual distance error. This distribution of errors may be analyzed to characterize the repeatability of the calibrated multi-view triangulation system. If there is a known distance between the reference features (e.g. when they are both provided by a single reference object imaging position.), the accuracy of the distribution of errors may also be determined. Of course, additional reference features may be incorporated into this procedure, to further multiply the number of distances available for analysis. In general, the number of orientations analyzed for particular reference feature, and the number of reference features analyzed, may be chosen to provide a desired level of confidence in the determinations of repeatability and/or accuracy. Thus, the embodiment of the verification method outlined above is exemplary only, and not limiting.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for calibrating a multi-view vision-based touch probe system, the method comprising:
   (A) providing a manual touch probe comprising a marker pattern including at least three probe markers and a probe tip that is fixed relative to the marker pattern;
   (B) providing a multi-view triangulation system comprising at least two imaging viewpoints having intersecting fields of view, each viewpoint having a camera operable to provide an image of a probe marker located in the intersecting fields of view, and the triangulation system operable to determine first-level 3D coordinates for the probe marker based on a set of triangulation images comprising at least two respective images of the probe marker from at least two respective viewpoints;
   (C) providing a reference object at least one imaging position in the intersecting fields of view, the reference object comprising a plurality of probe tip positioning reference features, wherein each of the plurality of probe tip positioning reference features has at least one of a known geometric relationship and a known coordinate relationship in relation to other probe tip positioning reference features;
   (D) providing a triangulation geometry characterization that is usable for determining 3D coordinates for a probe marker based on a set of triangulation images comprising at least two respective images of the probe marker from at least two respective viewpoints;
   (E) estimating first-level 3D coordinates for each of a plurality of the probe tip positioning reference features positioned with the reference object at the at least one imaging position in the intersecting fields of view, the estimating comprising for each such probe tip positioning reference feature:

(E1) constraining the probe tip against translation at that probe tip positioning reference feature, and providing at least four orientations of the manual touch probe and the marker pattern, and for each of those at least four orientations:

(E1a) acquiring a corresponding set of triangulation images, (E1b) determining first-level 3D coordinates of at least three of the probe markers in the marker pattern for that orientation, including applying the provided triangulation geometry characterization, and (E1c) analyzing the first-level 3D coordinates of the at least three probe markers in the marker pattern to determine first-level 3D coordinates for a marker pattern reference point of the marker pattern for that orientation;

(E2) estimating the first-level 3D coordinate position of the probe tip positioning reference feature based on the first-level 3D coordinates of at least four marker pattern reference points corresponding to the at least four orientations, such that the first-level 3D coordinate position of the probe tip positioning reference feature is estimated to be approximately equidistant to each of the first-level 3D coordinate positions of the at least four marker pattern reference points;

(F) determining a first-phase camera frame distortion characterization for at least one of errors and unknowns included in the first-level 3D coordinates, based on comparing at least one of the known geometric relationships and the known coordinate relationships between the probe tip positioning reference features to corresponding relationships that are based on the estimated first-level 3D coordinate positions of selected probe tip positioning reference features;

(G) providing a final camera frame geometry calibration including a portion corresponding to the provided triangulation geometry characterization and a portion corresponding to a most-recent-phase camera frame distortion characterization comprising one of the first-phase camera frame distortion characterization and a next-phase camera frame distortion characterization; and (H) providing a probe tip position calibration, comprising:

(H1) for each of at least one probe tip positioning reference feature, and for each of at least four orientations of the touch probe at that reference feature, determining calibrated 3D coordinates for the marker pattern reference points corresponding to the marker pattern at that orientation and determining a calibrated Local Coordinate System (LCS) corresponding to the marker pattern at that orientation;

(H2) for each of the at least one probe tip positioning reference feature of step (H1):

estimating calibrated 3D coordinates for the probe tip positioning reference feature based on the calibrated 3D coordinates of at least four marker pattern reference points corresponding to the at least four orientations of the touch probe at that probe tip positioning reference feature, such that the calibrated 3D coordinates of those at least four marker pattern reference points are approximately equidistant to the calibrated 3D coordinates of the probe tip positioning reference feature, and for each of the at least four orientations of the touch probe at that probe tip positioning reference feature, determining a probe tip position vector that extends from the calibrated marker pattern reference point 3D coordinates expressed in the LCS corresponding to that orientation to the calibrated 3D coordinates of the reference feature expressed in the LCS corresponding to that orientation; and (H3) determining the provided probe tip position calibration based on the determined probe tip position vectors.

2. The method of claim 1, wherein in step (D) providing the triangulation geometry characterization comprises recalling a previously stored triangulation geometry characterization for the multi-view triangulation system, and in step (G) providing a final camera frame geometry calibration including a portion corresponding to the provided triangulation geometry characterization comprises retaining the previously stored triangulation geometry characterization for the multi-view triangulation system.

3. The method of claim 2, wherein in step (F) the first-phase camera frame distortion characterization comprises a non-linear scaling portion that characterizes errors included in the first-level 3D coordinates.

4. The method of claim 2, further comprising:

corresponding to each of a plurality of probe tip positioning reference features in at least one imaging position, determining next-level 3D coordinates of at least four marker pattern reference points corresponding to at least four orientations of the touch probe at that reference feature, including applying the first-phase camera frame distortion characterization to estimate the next-level 3D coordinates of the at least four marker pattern reference points;

corresponding to each of the plurality of probe tip positioning reference features in the at least one imaging position, estimating the next-level 3D coordinate position of the probe tip positioning reference feature based on the next-level 3D coordinates of the at least four marker pattern reference points corresponding to the at least four orientations, such that the next-level 3D coordinate position of the probe tip positioning reference feature is estimated to be approximately equidistant to each of the next-level 3D coordinate positions of the at least four marker pattern reference points; and determining a next-phase camera frame distortion characterization for at least one of errors and unknowns included in the next-level 3D coordinates, based on comparing at least one of the known geometric relationships and the known coordinate relationships between the probe tip positioning reference features to corresponding relationships that are based on the estimated next-level 3D coordinate positions of selected probe tip positioning reference features;

wherein in step (G) the most-recent-phase camera frame distortion characterization comprises the next-phase camera frame distortion characterization.

5. The method of claim 4, wherein determining the next-level 3D coordinates of the at least four marker pattern reference points comprises applying the first-phase camera frame distortion characterization to estimate the next-level 3D coordinates of at least three probe markers in the corresponding marker pattern, and determining the next-level 3D coordinates of each of the at least four marker pattern reference points based on the next-level 3D coordinates of the at least three probe markers in the corresponding marker pattern.

6. The method of claim 1, wherein in step (D) providing the triangulation geometry characterization comprises providing a current triangulation geometry characterization, based on at least one set of current triangulation images that are provided by operating the multi-view triangulation system under current calibration conditions.

7. The method of claim 6, further comprising:
corresponding to each of a plurality of probe tip positioning reference features in at least one imaging position, determining next-level 3D coordinates of at least four marker pattern reference points corresponding to at least four orientations of the touch probe at that reference feature, including applying the first-phase camera frame distortion characterization to estimate the next-level 3D coordinates of the at least four marker pattern reference points;
corresponding to each of the plurality of probe tip positioning reference features in the at least one imaging position, estimating the next-level 3D coordinate position of the probe tip positioning reference feature based on the next-level 3D coordinates of the at least four marker pattern reference points corresponding to the at least four orientations, such that the next-level 3D coordinate position of the probe tip positioning reference feature is estimated to be approximately equidistant to each of the next-level 3D coordinate positions of the at least four marker pattern reference points; and
determining a next-phase camera frame distortion characterization for at least one of errors and unknowns included in the next-level 3D coordinates, based on comparing at least one of the known geometric relationships and the known coordinate relationships between the probe tip positioning reference features to corresponding relationships that are based on the estimated next-level 3D coordinate positions of selected probe tip positioning reference features;
wherein in step (G) the most-recent-phase camera frame distortion characterization comprises the next-phase camera frame distortion characterization.

8. The method of claim 6, wherein in step (D) the at least one set of current triangulation images on which the current triangulation geometry characterization is based comprises at least one set of triangulation images acquired during the operations operation of step (E1a).

9. The method of claim 6, wherein in step (G) the most-recent-phase camera frame distortion characterization comprises the first-phase camera frame distortion characterization.

10. The method of claim 9, wherein the first-phase camera frame distortion characterization includes a portion that provides a first-order scaling component that is the same along each of three 3D coordinate axes.

11. The method of claim 10, wherein the first-phase camera frame distortion characterization does not include a portion that provides non-linear scaling.

12. The method of claim 11, wherein in step (D) providing a current triangulation geometry characterization comprises performing a relative orientation analysis based on at least five respective 2D triangulation coordinate sets corresponding to at least five respective probe marker locations provided in the at least one set of current triangulation images.

13. The method of claim 1, wherein in step (C) the plurality of probe tip positioning reference features comprises at least four non-coplanar probe tip positioning reference features.

14. The method of claim 1, wherein in step (C) the plurality of probe tip positioning reference features comprises at least two probe tip positioning reference features, and the at least one imaging position comprises at least two imaging positions.

15. The method of claim 1, further comprising:
(I) based on the final camera frame geometry calibration and the probe tip position calibration, determining a first respective set of M measurement locations based on M sets of triangulation images that correspond to M orientations of the touch probe with its probe tip constrained against translation at a first respective probe tip positioning reference feature;
(J) based on the final camera frame geometry calibration and the probe tip position calibration, determining a second respective set of N measurement locations based on N sets of triangulation images that correspond to N orientations of the touch probe with its probe tip constrained against translation at a second respective probe tip positioning reference feature;
(K) determining a set of measurement distances comprising distances from each of a plurality of members of the first respective set of M measurement locations to each of a plurality of members of the second respective set of N measurement locations; and
(L) characterizing at least one of a repeatability and an accuracy of the multi-view triangulation system based on the set of measurement distances.

16. The method of claim 15, wherein step (K) is performed in a manner that provides a set of measurement distances comprising distances from each one of the M measurement locations of the first respective set to each one of the N measurement locations of the second respective set.

17. The method of claim 15, wherein the M sets of triangulation images and the N sets of triangulation images comprise sets of triangulation images acquired during the operation of step (E1a).

* * * * *

UNITED STATES PATENT AND TRADEMARK OFFICE
CERTIFICATE OF CORRECTION

PATENT NO. : 8,055,466 B2  
APPLICATION NO. : 12/050850  
DATED : November 8, 2011  
INVENTOR(S) : R. K. Bryll Page 1 of 1

It is certified that error appears in the above-identified patent and that said Letters Patent is hereby corrected as shown below:

In the Specification

| COLUMN | LINE | ERROR |
|---|---|---|
| (57) Pg. 1, col. 2 | Abstract 10 of text | after "camera" delete "," |

In the Claims

| | | |
|---|---|---|
| 27 (Claim 8, | 44 line 5) | before "operation" delete "operations" |

Signed and Sealed this  
Eighth Day of October, 2013

Teresa Stanek Rea  
*Deputy Director of the United States Patent and Trademark Office*